US010061573B2

(12) United States Patent
Araya et al.

(10) Patent No.: US 10,061,573 B2
(45) Date of Patent: Aug. 28, 2018

(54) USER INTERFACES OF APPLICATION PORTING SOFTWARE PLATFORM

(71) Applicant: MOBILIZE.NET CORPORATION, Bellevue, WA (US)

(72) Inventors: Carlos Araya, Cartago (CR); Iván Sanabria, Cartago (CR); Federico Zoufaly, San José (CR); Mauricio Rojas, Heredia (CR); Edgar Infante, Cartago (CR); Olman Garcia, San José (CR)

(73) Assignee: MOBILIZE.NET CORPORATION, Bellevue, WA (US)

( * ) Notice: Subject to any disclaimer, the term of this patent is extended or adjusted under 35 U.S.C. 154(b) by 0 days.

(21) Appl. No.: 14/686,766

(22) Filed: Apr. 14, 2015

(65) Prior Publication Data

US 2015/0234642 A1 Aug. 20, 2015

Related U.S. Application Data

(63) Continuation-in-part of application No. 14/160,521, filed on Jan. 21, 2014, now Pat. No. 9,459,862, which
(Continued)

(51) Int. Cl.
*G06F 9/45* (2006.01)
*G06F 8/51* (2018.01)
(Continued)

(52) U.S. Cl.
CPC ............ *G06F 8/51* (2013.01); *G06F 3/04842* (2013.01); *G06F 8/447* (2013.01); *G06F 8/76* (2013.01)

(58) Field of Classification Search
CPC ................................................ G06F 8/40–8/51
See application file for complete search history.

(56) References Cited

U.S. PATENT DOCUMENTS 5,313,614 A * 5/1994 Goettelmann ............ G06F 8/52
717/138
5,812,851 A 9/1998 Levy et al.
(Continued)

OTHER PUBLICATIONS

Putrycz, Erik, and Anatol W. Kark. "Recovering business rules from legacy source code for system modernization." International Workshop on Rules and Rule Markup Languages for the Semantic Web. Springer, Berlin, Heidelberg, 2007.*
(Continued)

*Primary Examiner* — Chameli Das
*Assistant Examiner* — Joanne Macasiano
(74) *Attorney, Agent, or Firm* — Han Santos, PLLC

(57) ABSTRACT

User interfaces of a software platform that generates transformed code from source code enable interaction with the codes. In various embodiments, the software platform may store the source code and the transformed code in a data store. The transformed code is a transformation of the source code by at least one business semantic preserving code transform. The at least one business semantic preserving transform causes an execution of the transformed code in a new execution scenario to produce an identical semantic effect as an execution of the source code in an old execution scenario. Subsequently, the software platform may cause a display of a user interface of the application on a display device. The user interface may provide one or more user command items for manipulating at least one of the source code or the transformed code stored in the data store.

24 Claims, 12 Drawing Sheets

Related U.S. Application Data is a continuation-in-part of application No. 13/842,519, filed on Mar. 15, 2013, now Pat. No. 9,465,608.

(60) Provisional application No. 61/758,217, filed on Jan. 29, 2013.

(51) Int. Cl.
*G06F 3/0484* (2013.01)
*G06F 8/41* (2018.01)
*G06F 8/76* (2018.01)

(56) References Cited

U.S. PATENT DOCUMENTS

| | | | |
|---|---|---|---|
| 6,353,925 B1 | 3/2002 | Stata et al. | |
| 6,356,285 B1* | 3/2002 | Burkwald | G06F 8/75 345/440 |
| 6,542,908 B1 | 4/2003 | Ims | |
| 6,738,967 B1 | 5/2004 | Radigan | |
| 6,862,559 B1 | 3/2005 | Hogg | |
| 7,543,270 B1* | 6/2009 | Grace | G06F 8/30 715/203 |
| 8,191,038 B1 | 5/2012 | Samuel et al. | |
| 8,359,586 B1 | 1/2013 | Orofino et al. | |
| 2001/0044811 A1 | 11/2001 | Ballantyne et al. | |
| 2003/0083900 A1 | 5/2003 | Khriss et al. | |
| 2003/0212698 A1 | 11/2003 | Mani et al. | |
| 2004/0054946 A1 | 3/2004 | Atallah et al. | |
| 2004/0068716 A1 | 4/2004 | Stevens | |
| 2004/0225952 A1 | 11/2004 | Brown et al. | |
| 2005/0108692 A1 | 5/2005 | Lau et al. | |
| 2005/0177814 A1* | 8/2005 | Martlage | G06F 8/38 717/102 |
| 2006/0070053 A1 | 3/2006 | Andersen et al. | |
| 2006/0100975 A1 | 5/2006 | McMaster et al. | |
| 2006/0236307 A1 | 10/2006 | DeBruin et al. | |
| 2007/0169018 A1 | 7/2007 | Coward | |
| 2007/0245320 A1 | 10/2007 | Cotichini et al. | |
| 2007/0245330 A1 | 10/2007 | Lapounov et al. | |
| 2007/0256058 A1 | 11/2007 | Marfatia et al. | |
| 2007/0288751 A1 | 12/2007 | Rits | |
| 2008/0222616 A1* | 9/2008 | Cheng | G06F 8/51 717/137 |
| 2008/0244517 A1 | 10/2008 | Rostoker | |
| 2009/0064091 A1 | 3/2009 | Tonkin et al. | |
| 2009/0077091 A1* | 3/2009 | Khen | G06F 8/34 |
| 2009/0119773 A1 | 5/2009 | D'Amore et al. | |
| 2009/0313613 A1* | 12/2009 | Ben-Artzi | G06F 8/51 717/137 |
| 2010/0074419 A1 | 3/2010 | Poremba | |
| 2010/0269096 A1* | 10/2010 | Araya | G06F 8/71 717/113 |
| 2010/0287525 A1 | 11/2010 | Wagner | |
| 2011/0055807 A1 | 3/2011 | Mahajan et al. | |
| 2011/0154305 A1 | 6/2011 | LeRoux et al. | |
| 2011/0179347 A1 | 7/2011 | Proctor et al. | |
| 2011/0185354 A1 | 7/2011 | Tanner et al. | |
| 2011/0296391 A1 | 12/2011 | Gass et al. | |
| 2011/0314445 A1 | 12/2011 | Dutta et al. | |
| 2011/0320588 A1 | 12/2011 | Raleigh | |
| 2012/0185821 A1 | 7/2012 | Yaseen et al. | |
| 2012/0192163 A1 | 7/2012 | Glendenning et al. | |
| 2013/0073614 A1 | 3/2013 | Shine et al. | |
| 2013/0125098 A1 | 5/2013 | Dhoolia et al. | |
| 2013/0145346 A1 | 6/2013 | Liu et al. | |
| 2013/0198720 A1 | 8/2013 | Maurice et al. | |
| 2014/0317591 A1 | 10/2014 | Rosomoff | |
| 2015/0278336 A1* | 10/2015 | Wadhwani | G06F 17/30595 707/748 |

OTHER PUBLICATIONS

Chandra, Satish, et al. "Using Logical Data Models for Understanding and Transforming Legacy Business Applications." IBM Systems Journal, vol. 45, No. 3, 2006, pp. 647-655.*
U.S. Appl. No. 14/160,521—Final Office Action dated Sep. 24, 2015, 56 pages.
U.S. Appl. No. 13/842,519—Final Office Action dated Nov. 4, 2015, 60 pages.
U.S. Appl. No. 14/160,521—Non Final Office Action dated Mar. 16, 2015, 45 pages.
U.S. Appl. No. 13/842,519—Non Final Office Action dated Jan. 14, 2015, 50 pages.
Razavi et al., "Partial Evaluation of Model Transformations." Proceedings of the 34th International Conference on Software Engineering. IEEE Press, 2012.
U.S. Appl. No. 13/842,519—Notice of Allowance dated Feb. 29, 2016, 14 pages.
U.S. Appl. No. 14/160,521—Notice of Allowance dated Mar. 14, 2016, 29 pages.
U.S. Appl. No. 14/676,140—Non-Final Office Action dated Feb. 2, 2016, 40 pages.
Zou, Ying. "Quality Driven Software Migration of Procedural Code to Object-Oriented Design." Software Maintenance, 2005. Engineering. IEEE Press, 2012.
Final Office Action dated Jul. 14, 2016 in U.S. Appl. No. 14/676,140, 32 pages.
Office Action dated Mar. 14, 2017 in U.S. Appl. No. 14/676,140, 34 pages.
Final Office Action dated Sep. 25, 2017 in U.S. Appl. No. 14/676,140, 36 pages.
Notice of Allowance for U.S. Appl. No. 14/676,140 dated Feb. 28, 2018, 43 pages.
Kalsing et al., "An Incremental Process Mining Approach to Exact Knowledge from Legacy Systems," 2010 14th IEEE International Enterprise Distributed Object Computing Conference, Vitoria, 2010, pp. 79-88.
Sneed et al., "Extracting business rules from source code," Program Comprehension, 1996, Proceedings., Fourth Workshop on, Berlin, 1996, pp. 240-247.

\* cited by examiner

USER INTERFACES OF APPLICATION PORTING SOFTWARE PLATFORM

RELATED APPLICATIONS

This patent application is a continuation-in-part of application Ser. No. 14/160,521, titled "Automated Porting of Application to Mobile Infrastructures", filed Jan. 21, 2014, in which application Ser. No. 14/160,521 claims the benefit of application Ser. No. 13/842,519, titled "Code Separation with Semantic Guarantees" filed Mar. 15, 2013, and application Ser. No. 14/160,521 also claims the benefit of Provisional Application No. 61/758,217, titled "Automated Porting of Applications Across Enterprise Infrastructures" filed Jan. 29, 2013, all of which are incorporated by reference in full herein.

BACKGROUND

Software applications, such as accounting, finance, and customer relations applications, may constitute a large, ongoing investment by an enterprise or other organization. For example, an enterprise information technology ("EIT") organization may invest in the initial requirements gathering and design of an application. Then EIT may invest in the software programming, development and testing of the application. Next enterprise data will have to be entered or ported into the application. Finally the application will be deployed, often constituting an expense of both hardware and/or training.

As the application is used and modified during its lifecycle, the application accrues modifications and bug fixes, as well as an accretion of business unit information technology ("BUIT") satellite applications. In this way, an ecosystem builds around the original software application. Eventually the application may become relied upon by the enterprise as the embodiment of the enterprise's policies. Thus, a software application not only represents a financial investment, but also an institutionalization of the enterprise's business procedures.

However, technology platforms evolve and business needs and policies evolve. An example of the former is where an initial investment in a two tier client server software architecture may give way to three tier enterprise data center based architectures which in turn evolve into web based applications and cloud based applications, each time causing applications to be ported to the newer software architectures. Another example of the former is where programming languages and frameworks become deprecated, such as where Microsoft Visual Basic.NET™ and the .NET application framework was not fully backwards compatible with Microsoft Visual Basic 6 and its Component Object Model based infrastructure, giving rise to applications being ported. An example of the latter is where the C Standard Library <string.h> library was later found to be susceptible to buffer overrun security attacks, causing applications to be moved to fixed buffer equivalents.

Typically, porting an application to a new software architecture, or platform causes a full rewrite. Since the rewrite is to a new architecture, or platform, or represents some other form of code refactoring, the port will not behave exactly in the same way as before. For example, a personal computer based client application may be ported to a mobile device. Accordingly, the functionality of the ported application on mobile device will differ at least according to the form factor change.

The functionality change causes risk that the semantics of the rewrite will not exactly conform to the behavior of the original application. If this were to happen, BUTT satellite applications and other software applications interfacing with the original application may break.

This state of affairs leaves EIT organizations on the horns of a dilemma. The extension of the lifecycle of their mission critical software applications may rely on a successful port to a new architecture or platform. But to do so, the EIT organization may have to risk a non-conforming port. In other words, the EIT organization cannot rely on semantics to be preserved during a port.

BRIEF DESCRIPTION OF THE DRAWINGS

The Detailed Description is set forth with reference to the accompanying figures. In the figures, the left-most digit(s) of a reference use of the same reference numbers in different figures indicates similar or identical items.

DETAILED DESCRIPTION

Figure 1:
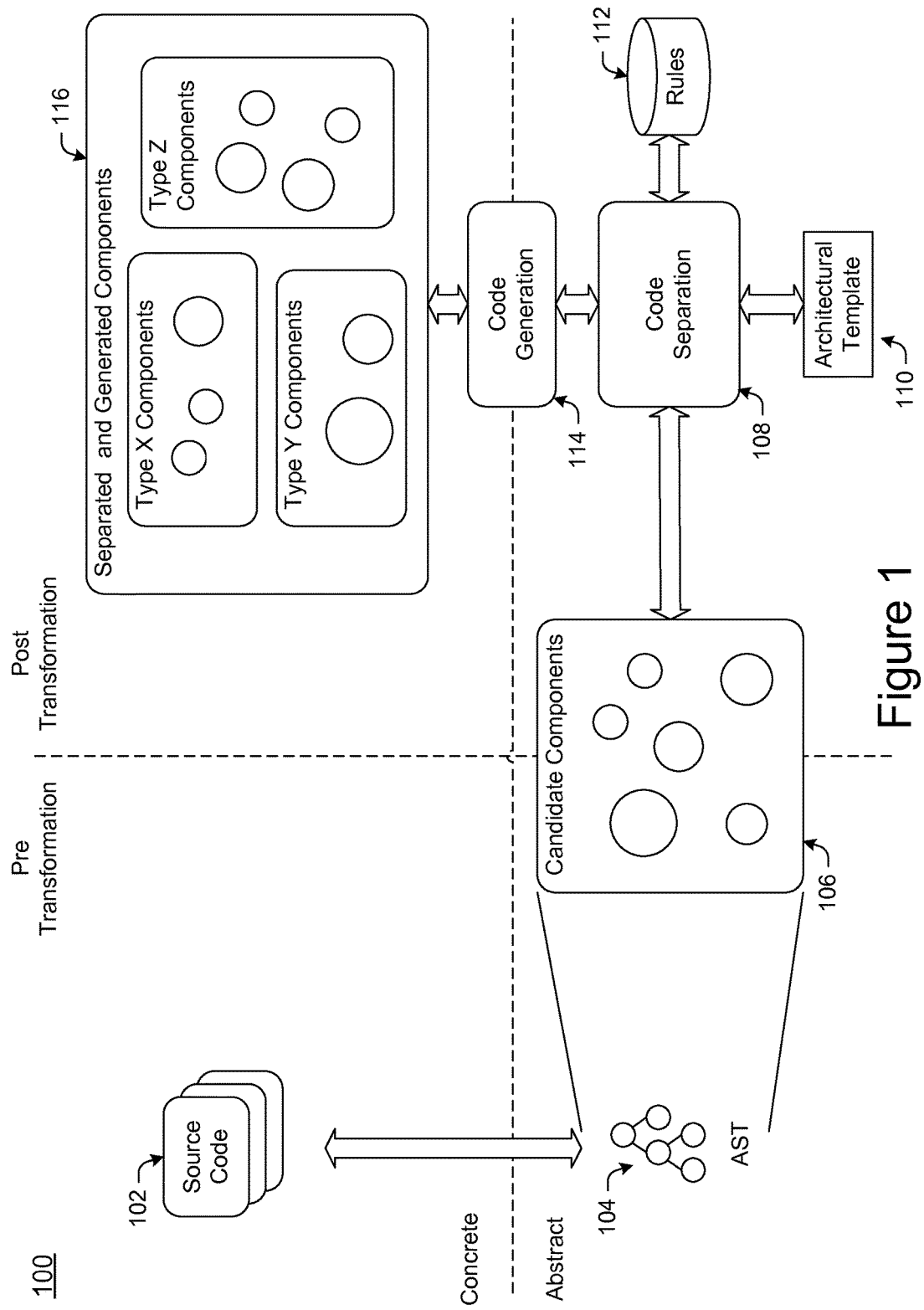
FIG. 1 is a top level context diagram for code separation with semantic guarantees.

This patent application discloses a transformation application that performs automated code transformation of software application using code separation with semantic guarantees. The transformation application may include a user interface that enables a user to interact with the application in order to command the application to perform different operations. The operations may include selection of source codes for transformation into transformed codes, providing for the review of source codes and transformed codes, comparison of the source codes and the transformed codes, preview of the execution of the source codes and the transformed codes, export of the transformed code, as well as other operations that manipulate the source codes and the transformed code. In this way, the user interface of the transformation application provides a convenient way for a user to access all the features that are provided by the transformation application.

Transformations, Code Separation and Semantic Guarantees

This transformation application performs automated code transformations of a software application by separating the code into components corresponding to a target architecture while guaranteeing semantic equivalence. Specifically, modern software applications are generally organized into separate components. Components may be loosely or tightly coupled and may have high or low degrees of cohesion. Accordingly, components are not merely functional blocks of code, but also include an invocation interface where the interface guarantees specific semantic behavior. In object oriented programming, a component's invocation interface is sometimes referred to as a "contract" thereby emphasizing the guarantee of specific semantic behavior.

Components are not homogenous. Components typically take on specialized roles in interacting with other components. In this way, components may be organized into parts of a larger software machine. For example in object oriented programming, design patterns are component interaction patterns where a generic component type may be specialized according to a particular application. For instance, one design pattern is the strategy design pattern where an abstract class is replaced with a concrete class depending on the context of a situation. Thus concrete components may take on the type of an abstract class.

Design patterns typically apply only to a part of a software application. However, there are patterns, called software architectural patterns, that cover an enter software application. Example software architectural patterns are model-view-controller ("MVC"), model-view ("MV"), and model-view-viewmodel ("MVVM"). Software architecture design is often driven by a platform. Specifically, a platform is the set of hardware and/or software that hosts and executes the software. A platform generally comprises hardware, an operating system, standard libraries and/or a software application framework. In the case of a virtual execution environment, the platform may not necessarily specify physical hardware but virtual hardware and an execution environment or virtual machine. In this way a platform describes the support infrastructure for a software application. As a result, a platform may describe the hardware architecture and platform software corresponding for various portions of a software architecture. For example, a mobile device may correspond to a client and a cloud based service may correspond to a web service. Thus an architecture, software or hardware or both, may give rise to a generic classes of components, known as component types.

Functionally Equivalent (Semantics Preserving) Transformations, Automation, and Abstract Syntax Trees Porting a software application involves porting the software application's source code. Typically source code is written in one or more programming languages, each programming language having its own grammar Early applications were written in a single programming language, such as FORTRAN or COBOL. Present enterprise applications are often written in multiple programming languages, often in the same source code file. For example, an application may use a structural language like Microsoft Visual Basic for procedures, but structured query language ("SQL"), for database access. By way of another example, web clients typically use some combination of hypertext markup language ("HTML"), cascading style sheets ("CSS"), and JavaScript.

As a result, in addition to porting to a different architecture, porting source code may involve transforming code expressed in multiple input grammars that represent the programming languages of the source code of the application to be ported, into code expressed in multiple output grammars representing the programming languages of the source code of the application after being ported. Enterprise applications, especially those that have been in operation for a relatively long time, are generally complex, may be large, and may be a hodge-podge of different programming languages and approaches as varied as the programmers who maintained the application.

Due to its complexity, porting an enterprise application is therefore a candidate program for computer automation. Specifically, the goal of a successful port is not only to achieve the architectural change and the translation across grammars, but also to preserve the semantics of the application's business logic after the porting process. That is to say, any invocation of the business logic post port should have the same behavior as prior to the port.

The emphasis on preserving semantics has the effect of de-emphasizing syntax. An automated approach to a port across architectures cannot be a naïve syntactic translation of the original components to the exact same components except in a different programming language. One approach to automating the porting process involves receiving input grammars and output grammars, developing a composite grammar, representing the application in an abstract syntax tree that supports the composite grammar. The abstract syntax tree may be annotated with transformational rules that impact either a node in the abstract syntax tree, all nodes in a sub-tree of the abstract syntax tree, or the entire abstract syntax tree. In this way, porting can be effected by traversing the abstract syntax tree and using the transformational rules in the annotations to determine what output code to generate.

The Notion of Code Separation

However, after a port, the architectural changes and grammar changes will change some of the functionality of original application vis-à-vis the ported application. At the very least, the ability to run on a new architecture constitutes a functional change. With an architectural change, components in the original application may not have a one to one correspondence with components in the ported application. Thus during a port, a decision is made as to which semantics are to be preserved.

Code separation is the process of identifying which portions of the source code of the original application map to different portions of a target architecture. Correctly separating code is the basis for a successful port. Consider the case where an application's client application was originally targeted for a personal computer but is being ported to a mobile phone. The user interfaces of the client applications will differ due to the form factor change. However both client applications should be able to expect that interactions with the business logic will be the same as in the original application. Therefore, separating code for the client from code for the business logic provides a basis for determining which semantics to preserve during a port.

Code Separation and Different Transformations

Code separation will have a varying role in an application port depending on the transformation to be achieved. A transformation is a deterministic alteration of source code to achieve a desired result. Since a transformation is achieved by the application of a deterministic algorithm, typically the transformation may be reversed by applying the inverse of the algorithm. However, transformations are not necessarily commutative.

Some transformations will not involve code separation. For example, a pure language port that does not involve an architectural change is less likely to use code separation. Language based changes such as compilation, or insertion of artifacts such as debug information, tend to preserve architecture.

However, other transformations will rely on code separation. In particular, changes in hardware architecture, such as porting from a single core computer processing unit ("CPU") to a multi-core CPU, or to a system-on-a-chip ("SoC"), give rise to new hardware capabilities. Therefore the porting process will identify functionality in the original application that may take advantage of the new hardware. Similarly, porting software to a new framework, such as from COM to .NET, or to a new software architecture, such as a from two-tier client server to a web based services oriented architecture ("SOA") is likely to rely on code separation since the component types in the original application will not have a one to one correspondence to the components types of the targeted architecture. In general, the greater the difference in architecture of the original application to the targeted architecture, the greater the reliance on code separation.

Differences in component types are not necessarily based on architecture. Some transformations, such as performance optimizations and code refactoring are not re-architecting transformations. For example, components may be combined into a single dynamic link library ("DLL") to improve load times. Similarly, during refactoring, analysis may identify redundant code and consolidate functionality accordingly. Automated modifications to support a global business policy change in an application may also use code separation as some components likely to embody the policy may be assigned a distinct component type.

The Context of Code Separation with Semantic Guarantees

Having introduced code separation, we turn now to the automation of code separation. FIG. 1 is an exemplary context diagram 100 for code separation with semantic guarantees. Specifically, an automated software application transformation may be considered in terms of moving from concrete terms to abstract terms, as represented by the horizontal dotted line, and in terms of moving from pre-transformation, i.e., the original application, to post-transformation, i.e., the ported application.

Source code 102 comprises a concrete representation of the original application. Source code 102 is typically in the form of source code files and is generally written in one or more programming languages, each programming language represented by a grammar.

The source code 102 may be statically analyzed, and represented in an annotated abstract syntax tree 104, which supports the input grammars of the programming languages in the original application, as well as the output grammars of the programming languages in the targeted architecture. The annotations in the abstract syntax 104 tree represent transformational rules that impact either a node in the abstract syntax tree 104, all nodes in a sub-tree of the abstract syntax tree 104, or the entire abstract syntax tree 104. Thus code generation may be effected by a traversal of the abstract syntax tree 104 while applying the transformational rules.

However, code generation will also include separating code into components. Code separation starts with identifying candidate components 106 by querying the abstract syntax tree 104. A code separation function 108 analyzes the candidate components 106 in view of an architectural template describing the target architecture 110, i.e., the architecture the original application is being ported to, and transformational rules 112. Note that the transformational rules 112 may be part of the abstract syntax tree 104 or may be stored separately. The code separation process is described in more detail with respect to FIG. 3.

Once the code separation function 108 has identified how code from the original application is to be mapped to components in the target architecture, a code generation function 114 may commence. During the code generation, in additional to translation to new languages the components of the target architecture may be wrapped with code to facilitate operation in the target architecture, and may be connected to additional infrastructure elements, such as a runtime to optimize execution. Accordingly, the code generation function 114 may generate transformed code 116 from the source code 102.

Exemplary Hardware Platform

Figure 2:
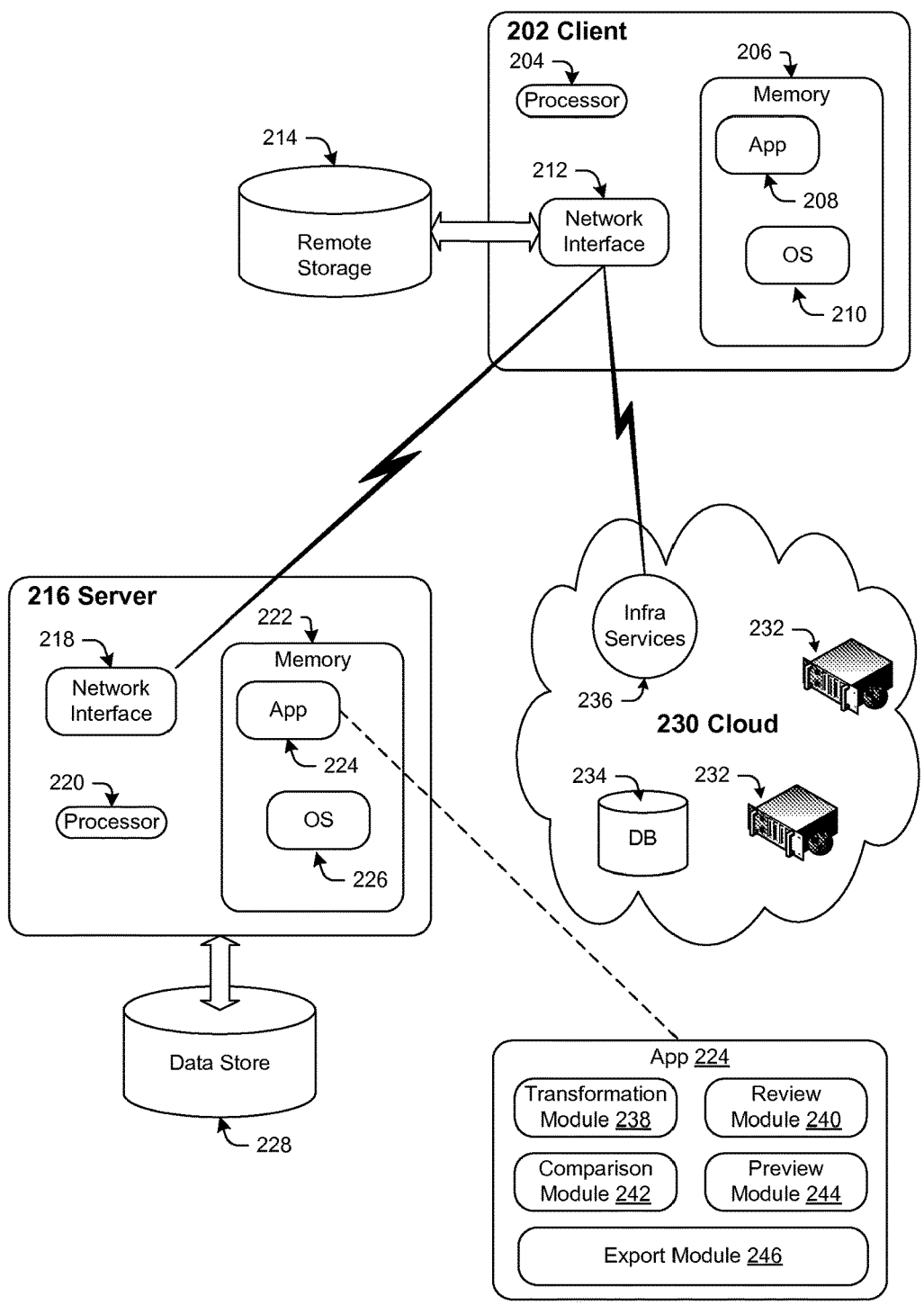
FIG. 2 is a hardware diagram of an exemplary hardware and software platform for code separation with semantic guarantees.

FIG. 2 illustrates one possible embodiment of a hardware environment 200 for code separation with semantic guarantees. Client device 202 is any computing device. A client device 202 may have a processor 204 and a memory 206. Client device 202's memory 206 is any computer-readable media which may store several programs including an application 208 and/or an operating system 210.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

To participate in a communications environment, user equipment device 202 may have a network interface 212. The network interface 212 may be one or more network interfaces including Ethernet, Wi-Fi, or any number of other physical and data link standard interfaces. In the case where the programming language transformations are to be done on a single machine, the network interface 212 is optional.

Client device 202 may use the network interface 212 to communicate to remote storage 214. Remote storage 214 may include network aware storage ("NAS") or may be removable storage such as a thumb drive or memory stick.

Client device 202 may communicate to a server 216. Server 216 is any computing device that may participate in a network. Client network interface 212 may ultimate connect to server 216 via server network interface 218. Server network interface 218 may be one or more network interfaces as described with respect to client network interface 212.

Server 216 also has a processor 220 and memory 222. As per the preceding discussion regarding client device 202, memory 222 is any computer-readable media including both computer storage media and communication media.

In particular, memory 222 stores software which may include an application 224 and/or an operating system 226. Memory 222 may also store applications 224 that may include a database management system. Accordingly, server 216 may include data store 228. Data store 228 may be configured as a relational database, an object-oriented database, and/or a columnar database, or any configuration to support policy storage. The application 224 may perform software application transformation using code separation with semantic guarantees. The application 224 may also perform other operations. These operations may include comparisons of source codes and transformed codes that are generated from the source codes via one or more application user interfaces. The operations may further include providing for the review of source codes and transformed codes, preview of the execution of the source codes and the transformed codes, export of the transformed code, and/or so forth. In at least one embodiment, the application 224 may include a transformation module 238, a review module 240, a comparison module 242, a preview module 244, and an export module 246. Each of the modules may include routines, programs instructions, objects, and/or data structures that perform particular tasks or implement particular abstract data types.

The transformation module 238 may perform code transformation using code separation with semantic guarantees. For example, the transformation module 238 may receive source code from the client device 202 via the network interface 212. In turn, the transformation module 238 may transform the source code into transformed code using code separation with semantic guarantees. The source code and the transformed code may be for different scenarios that include different target architecture requirements, different optimization requirements, different user cardinality requirements, different sets of hardware form factors, different sets of hardware platforms, different execution performance requirements, and/or different programming languages. However, the transformation of the source code into the transformed code is business semantic preserving due to the semantic guarantees. In other words, the business logic of the source code is semantically preserved as the source code is transformed into the transformed code, such that the transformed code can be used to achieve the same semantic effect (e.g., one or more business objectives) as the source code.

The review module 240 may provide a user interface that enables a user to edit the source code or the transformed code. Following the modification of the source code, the modified source code may be reprocessed by the transformation module. The user may edit the transformed code to correct errors in the transformed code that is produced during the code transformation or to further optimize the transformed code.

The comparison module 242 may provide a user interface that enables the comparison of the source code and the transformed code. For example, the user interface may be used to highlight the differences between corresponding code sections of the source code and the transformed code, the degrees of confidence in the proper transformation between the source code and the transformed code, and/or the alignment of the transformations that occur between the source code and the transformed code. The functions of the comparison module 242 are further described in FIG. 7.

The preview module 244 enable the execution of code sections of the transformed code without the use of a separate IDE. In various embodiments, the preview module 244 may provide event handler information, corresponding source codes, and/or stack tracing data during the execution functions embodied by the code sections. The functions of the preview module 244 are further described in FIG. 8. The export module 246 may provide a user interface that enables a user to direct the application 224 to export the transformed code to an additional application or an original application that is the origin of the source code. In various embodiments, an application that is modified with the transformed code may be sent back to the client device 202 for execution or the application may be redistributed to one or more servers for execution. The functions of the export module 246 are further described in FIG. 9.

Server 216 need not be on site or operated by the client enterprise. Server 216 may be hosted in a cloud 230. Cloud 230 may represent a plurality of disaggregated servers which provide virtual web application server 232 functionality and virtual database 234 functionality. Cloud 230 services 232, 234 may be made accessible via cloud infrastructure 236. Cloud infrastructure 236 not only provides access to cloud services 232, 234 but also billing services. Cloud infrastructure 236 may provide additional service abstractions such as Platform as a Service ("PAAS"), Infrastructure as a Service ("IAAS"), and Software as a Service ("SAAS").

Figure 3:
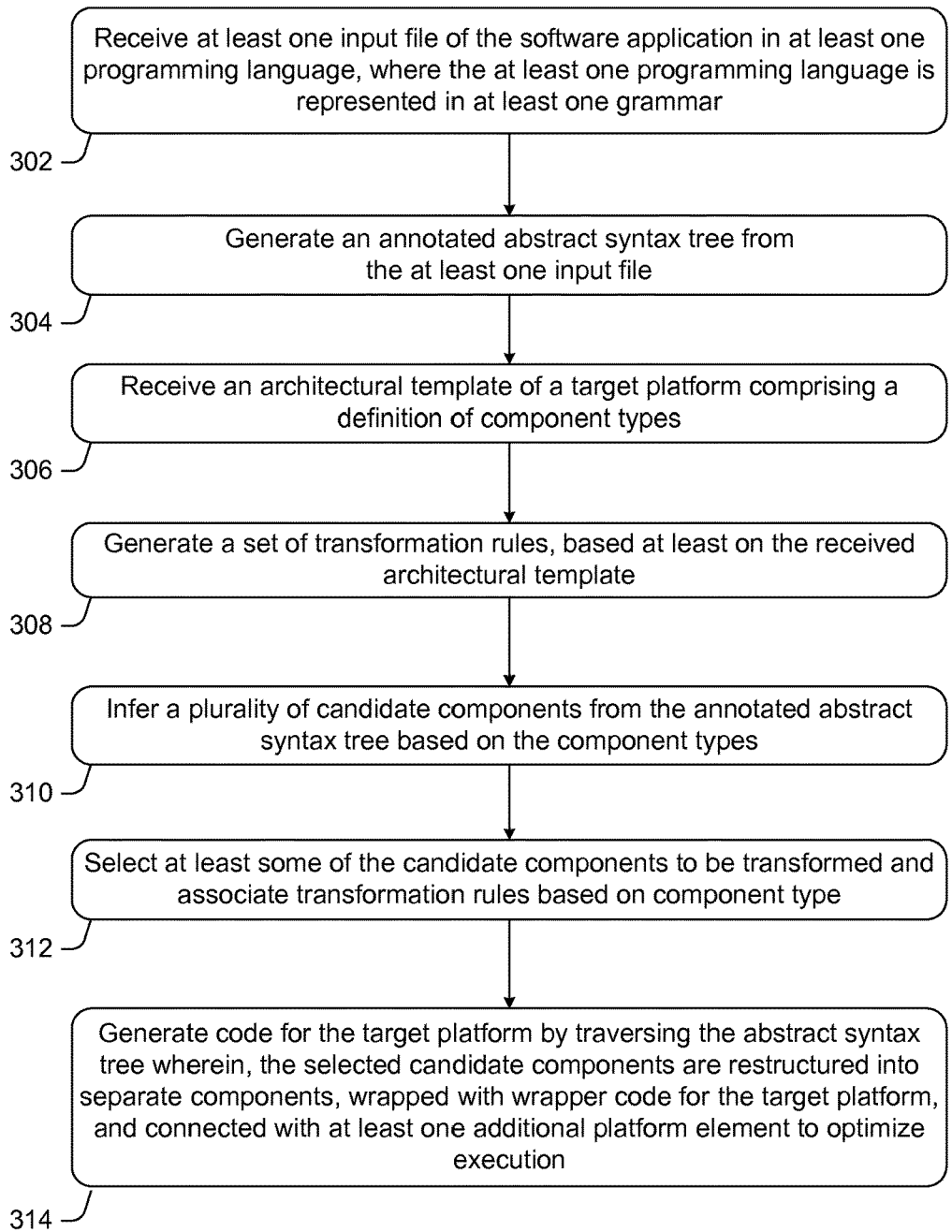
FIG. 3 is a flowchart of an exemplary operation of a software application transformation using code separation with semantic guarantees.

Example Operation of Performing a Software Application Transformation Using Code Separation with Semantic Guarantees Software application ports are a form of software application transformation. Where the application architecture is to change, or where the application transformation gives rise to changes in component types, code separation techniques that preserve semantics are to be brought to bear. FIG. 3 illustrates a flowchart 300 of the example operation of performing a software application transformation using code separation with semantic guarantees.

In block 302, input comprising source code is received. Source code may be in the form of files written in one or more programming languages, each programming language represented in a grammar.

A code separation function may access the source code transformed into an abstract syntax tree that supports the input grammars of the source code of the original application as well as the output grammars of the target architecture, i.e., the architecture of the ported application. The abstract syntax tree may be annotated with transformational rules.

In block 304, an annotated abstract syntax tree is generated from at least one of the source code files of the original application. In this way, a port of a selected portion of the original application or a complete port of the entire original application may be effected.

In block 306, the code separation function receives an architectural template. The architectural template may describe a hardware architecture and/or a software architecture. The architectural template may describe solely the target software architecture, or may additionally describe a target platform comprising a target hardware architecture and support software such as an operating system, support libraries and/or frameworks, or an execution environment or virtual machine. In the case where the architectural template describes the target platform, the architectural template may also describe the advantages and disadvantages of the target platform. For example, where the target platform is distributed, the architectural template may indicate where performance may be degraded by network connections due to remote communications. By way of another example, the architectural template may indicate strong parallel processing capabilities, as in a server. In this way, the architectural template may provide input that may weigh the selection of components for a corresponding component type.

The architectural template will provide the basis for defining component types. For example, a software architecture may prescribe a client tier, a business logic tier, and a persistence tier. Each of these tier may represent a component type. Other software architectures include examples such as model-view-controller, model-view, and model-view-viewmodel. The specific example of model view viewmodel is discussed in more detail with respect to FIG. 5.

Alternatively, the architectural template may represent a business architecture instead, where each component type enumerates a function corresponding to the organization of the business enterprise such as departments and cost centers.

In the case of hardware architectures, the architectural template may describe a cloud infrastructure using a service oriented architecture accessed by mobile devices. The architectural template may include information about additional functionality present in the target cloud architecture such as that exposed by Platform as a Service, Infrastructure as a Service, and Software as a Service functionality.

In block 308, the existing transformational rules in the annotated abstract syntax tree are augmented with a generated set of transformational rules specific to the received architectural template. Example transformational rules would include the generation of wrapper code corresponding to the component types described in the architectural template. Wrapper code may include simple "plumbing" code that allows invocation in the new architecture. For example, components that were once local to each other may be transformed into remote components invoking each other via remote procedure call ("RPC"). Other transformation rules may include converting components from stateful to stateless components where they are to reside in a middle tier. In some cases, instead of wrapper code, a component may be transformed by invoking a platform element to optimize execution. Platform elements may include prebuilt platform rearchitecture agents containing code artifacts for the target platform. For example, the platform elements for a web page may include prebuilt hypertext markup language ("HTML"), cascading style sheet ("CSS") and JavaScript files.

Note that it may be desirable for an architectural template to describe different transformation options for the same component type. For example, in a mobile device client scenario, a technician may desire to support both Apple iOS™ and Google Android™ embodiments of a client. In this case, components that have a client component type will have two sets of transformation rules, a first set corresponding to transforming the client components into an Apple iOS™ mobile client, and a second set corresponding to transforming the client components into a Google Android™ mobile client.

Not all transformation rules are driven by the architectural template. For example, the transformations translating the source code to the programming languages of the target architecture need not be generated from the architectural template.

Once the transformation rules specific to the architectural template are generated, the code separation function determines which components to apply those transformation rules. In block 310, the annotated abstract syntax tree is queried for candidate components. Candidate components are functional blocks with an invocation interface whose semantic behavior is guaranteed. The candidate components are inferred to be of a component type in the architectural template. Inferring candidate components to be of a specific component type is described in more detail with respect to FIG. 4.

Once the candidate components are associated with component types, in block 312, at least some candidate components are selected for transformation. In some cases, all the candidate components are selected. However, in other cases, a technician may be reviewing the candidate components via an integrated development environment ("IDE") or some other development tool, and may opt to override the inferences made in block 310. Based on these selections, the abstract syntax tree may be further annotated with additional transformation rules, where these additional transformation rules are associated with the selected components. If the additional rules are added while a code generation is in progress, then the code generation may be reperformed via an IDE or development tool.

In general, an IDE or development tool provides the opportunity to monitor the status of a code generation in progress. For example, a log of operations against the abstract syntax tree, such as annotated, component identification, component type identification, and repositioning may be viewed. Particularly large and complex trees may take a relatively long time, thus the log may be viewed substantially in real time. Accordingly, an IDE or development tool may receive input from a technician to modify a code generation operation while in progress.

Where the IDE or development tool receives input from a technician, the components in the abstract syntax tree directly affected by the input are identified. Since the abstract syntax tree effectively stores information about components affected by other components changing, usually in the form as storing components in an affected component's subtree. Thus the IDE or development tool can identify all components dependent on components directly affected by a change. Thus if a code generation is in progress, code generation for the directly affected components as well as their dependent components may be reperformed. In this way, correct code may be generated despite an input change from a technician, without forcing a full code regeneration of the entire abstract syntax tree.

An IDE or development tool may access an arbitrary abstract syntax tree. Therefore, an IDE or development tool may manage transformations on different abstract syntax trees. Conversely, an abstract syntax tree may store as plurality of transformation rules for the same components in its annotations. For example, client components may be annotated with transformation rules to target a tablet or a personal computer at the same time, and the IDE or development tool will select which transformation rules to apply. In this way, an abstract syntax tree may be shared.

Upon selection, the application is ported by generating code in block 312. Specifically, the abstract syntax tree is traversed, and pretty printed according to the transformational rules. Code generation may include the generation of wrapper code as described above. Code generation may also include the generation of infrastructural elements to optimize execution. For example, it may be appropriate to generate a runtime, or a helper library specific to the target architecture.

Inferring Component Types During Code Separation

Figure 4:
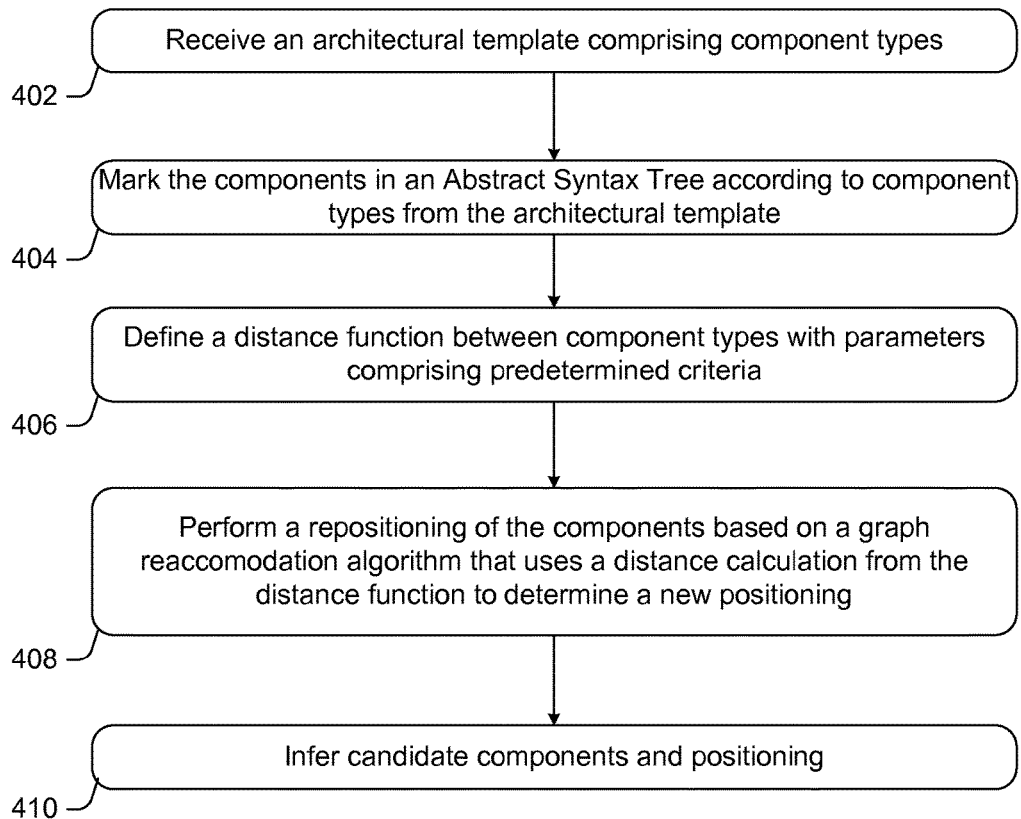
FIG. 4 is a flowchart of an exemplary operation of inferring components during code separation with semantic guarantees.

During code separation the code separation function infers which candidate components belong to a component type of the architectural template. Automated inference may be performed in a number of ways, but generally involves determining how similar a component is to a component type. FIG. 4 illustrates a flowchart of an exemplary embodiment 400 inferring a component type during code separation.

In block 402, the code separation function receives an architectural template comprising one or more component types as described with respect to FIG. 3 above.

Recall that at this point, there is an abstract syntax tree that supports input grammars of the programming languages of an original software application and output grammars of the programming languages of the target architecture. The abstract syntax tree also represents a parsing or static analysis of at least some of the source code the original software application. Accordingly, the abstract syntax tree contains components comprised of a functional source code block with an invocation interface that guarantees the semantic behavior of the functional source code block.

Thus in block 404, the code separation function marks the components in the abstract syntax tree as at least one of the component types of the architectural template. This results in an abstract syntax tree with a number of candidate components. It also results in a number of candidate components that are not necessarily organized by component type, and therefore may need repositioning.

To perform the repositioning, in block 406, a distance function for component types is defined in terms of parameters comprising predetermined criteria. A distance function for component types provides a similarity score for component to a component type. The distance function typically supports a metric, for example a Euclidean distance. In this way, the distance function provides a way to perform deterministic sorting where the components are ordered monotonically, based on similarity to a component type. This ordering is performed in block 408 by a graph reaccommodation algorithm that uses the distance function as a metric. Specifically, the graph reaccommodation algorithm repositions components based on similarity to a component type.

One consequence of the ability to perform ordered sorting by component type is that the code separation function can identify the outer boundaries of each component type. Therefore, the invocation interfaces on the outer boundaries may be configured to guarantee semantics, and the interior components that do not face components from other component types may potentially be refactored without changing semantics. For example, a middle tier object having a business object component type that faces client objects might not change its invocation interface, but a business objects that face other business objects might be merged or otherwise modified.

The distance function may be a function of one or more predetermined criteria which allow the distance to be weighted. Examples include, but are not limited to: component similarity, component affinity, and component performance based on component proximity. For component similarity, the distance measure may directly calculate how similar a component is to a component type. For component affinity, the distance measure may modify the calculation how similar a component is to a component type based on similarity to other components known to belong to that component type. For example, a radio button may be classified as a client component type if it is measured as similar to a standard button which was beforehand classified as a client component with high confidence. For component performance, the distance measure may be modified in terms of performance metrics. For example, a stateless business object that would ordinarily be grouped with other middle tier objects might be placed instead with client objects to limit network round trips. Thus even though the stateless business object is classified as a business object and likely would be placed in a middle tier, the distance measure may be weighted to place stateless business objects closer to the client component type.

The predetermined criteria may be have been received with an architectural template. For example an architectural template may have enumerated the advantages and disadvantages of a target platform. Based on those advantages and disadvantages, the distance function may be weighed to favor one component type over another, based on the characteristics of a component. The advantages and disadvantages may not be specific to component type, but may indicate a change in operation, such as in a service oriented architecture, specifying that some objects should be stateless objects to facilitate scalability. Alternatively, the predetermined criteria may be independent of architecture, and not necessarily have been received with an architectural template. For example, business policies and enterprise standards may be specified as the predetermined criteria for the distance function.

There are several examples of graph reaccommodation algorithms. One example is simulated annealing. Simulated annealing is a well-known algorithm where a large graph of objects may be organized. In the present example, the components comprise nodes in the graph, and the distance function defines the strength of connections between the nodes of the graph. The distance function is used to define a value to be tested for extrema (e.g. in this case typically a minima) After establishing an initial positioning, and the extrema value, the simulated annealing function iterates through potential repositionings. Where a repositioning improves the extrema value (e.g. a lower value is discovered if testing for minima), the repositioning is replaces the prior positioning. When a predetermined threshold is satisfied, for example a time limit or a desired extrema threshold, the simulated annealing iteration stops. The components in the abstract syntax tree are then repositioned according to the final positioning determined by the simulated annealing algorithm.

Another example of a graph reaccommodation algorithm is to use develop a lattice comprising multiple dimensions, each dimension corresponding to a component type. Components are then placed in the lattice according to similarity to the component type. A force function describing affinity between the components is then described. A first repositioning is then effected by first applying the force function to determine the degree of repulsion between the components. A second repositioning is then effect by then applying the force function to determine the degree of attraction between the components. The result is a repositioning of the components where components of similar component type aggregate.

In general, the where the overall ordering of a system may be represented based on component distances based on the distance function, the system may be deterministically reordered such that the components aggregate to their likely component types. One may consider variations on linear programming where a tableau describing the graph of components may be pivoted to a desired extrema. Accordingly, this patent application describes various graph reaccommodation techniques without loss of generality.

Regardless of the graphic reaccommodation algorithm used, or the distance function used, once the candidate components are repositioned, in block 410 the code separation algorithm may infer which candidate components have which component types based on the repositioning. At this point, the repositioned abstract syntax tree is ready for code generation as described with respect to FIG. 3 above.

Example Use Cases

The aforementioned code separation techniques may be used for a number of transformations. By way of example, a typically application is to port a legacy client-server application to a web based service oriented architecture ("SOA").

In this example, the server portion of the client-server application is hosted on a web infrastructure such as a cloud infrastructure. The client application may continue to be accessible via a personal computer, but as a web application. Furthermore, the client application may also be ported to various tablet targets and/or mobile phone targets.

Figure 5:
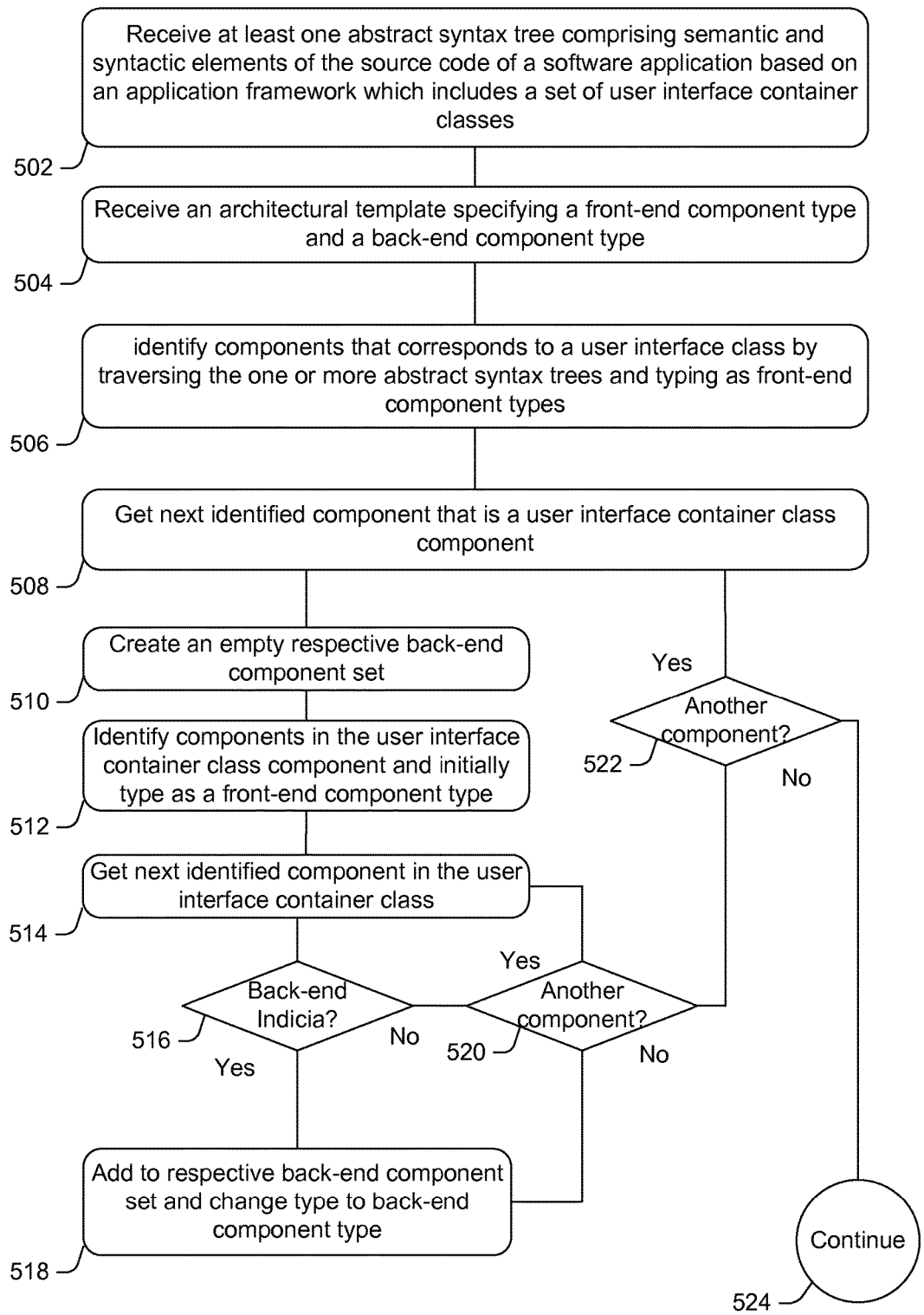
FIG. 5 is a flowchart of an exemplary operation of an MVVM re-architecture using code separation with semantic guarantees.

A typical software architecture is the model-view-viewmodel, which is used as the target architecture. Therefore, component types of model, view, and viewmodel are derived from the target architecture. Roughly speaking, the model may be the client side local data model, such as an extensible markup language ("XML") data island. The view may correspond to a client hypertext markup language ("HTML") and cascading style sheet ("CSS") client with embedded JavaScript that accesses the XML data island. Finally, the viewmodel may be a server side web service that serves the data island. FIG. 5 illustrates a flowchart of an exemplary embodiment of code separation with semantic guarantees in a port to a model-view-viewmodel target architecture.

As described with respect to FIG. 3 above, source code for a software application may be parsed or statically analyzed to generate one or more abstract syntax trees that capture the semantic and syntactic elements of the source code. In the present MVVM example, we assume the software application is written using an application framework that includes one or more user interface container classes. For example, .NET™ may include a Windows Form, and the Microsoft Foundation Classes™ include Dialog Box, Form, and Window and Document-View classes. In block 502 of embodiment 500, one or more abstract syntax trees for the software application are received.

In block 504, an architectural template specifying a front-end component type and a back-end component type is received. In the present example, the model-view portion of the target architecture corresponds to the front-end component type and the viewmodel portion of the target architecture corresponds to the back-end component type. Other mappings may exist. For example a view-controller portion of a model-view-controller architecture may correspond to the front-end component type and the model portion may correspond to the back-end component type. Thus while the present example is directed to MVVM architectures, other architectures with a front-end component type and a back-end component type are supported without loss of generality.

In block 506, the abstract syntax trees are traversed or otherwise queried for all instances of components that are a user interface container class in the application framework. Those components are then typed as front-end component types.

In block 508, the identified user interface container components are iterated. For each user interface container component, all components contained by the container class are grouped together. In block 510, a respective back-end component set is created. At this point, the back-end component set starts as an empty set.

In block 512, the components contained by the container class are iterated through. As each component is iterated in block 514, the code separation function seeks back-end indicia for the component in block 516. If back-end indicia are detected, then in block 518, the component is added to the respective back-end component set and the component type is changed to back-end component type. Otherwise, in block 520, the next component is retrieved. If the iteration is complete, then execution proceeds to block 522.

There are a number of back-end indicia. For example, the attributes of a component may be reviewed for references. If the references are made solely by business logic or persistence functions, then the component may be likely to be a back-end component. Framework class type may also assist. Many classes in an application framework are known to be either front-end or back-end types. Accordingly, the application framework type may be indicia of being a back-end component type (or not being a back-end component type). In other situations, a component may be compared to another component known to be a back-end component type. Where the similarity satisfies a predetermined threshold, the component may be determined to be a back-end component type.

The foregoing is not intended to be an exhaustive list of back-end indicia. Where an IDE or development tool is used in the code separation process, a technician may identify new heuristics or back-end indicia, and may modify the code separation process accordingly.

In block 522 the code separation function determines whether there is another user class component to iterate. If there is, then execution returns to block 508. Otherwise, execution continues to a next phase in block 524. At this point, after execution, the components are now typed either as front-end component types or as back end component types, completing the component type inference such as in block 310 of FIG. 3.

Operations Performed by the Software Platform to Interact with a User

Figure 6:
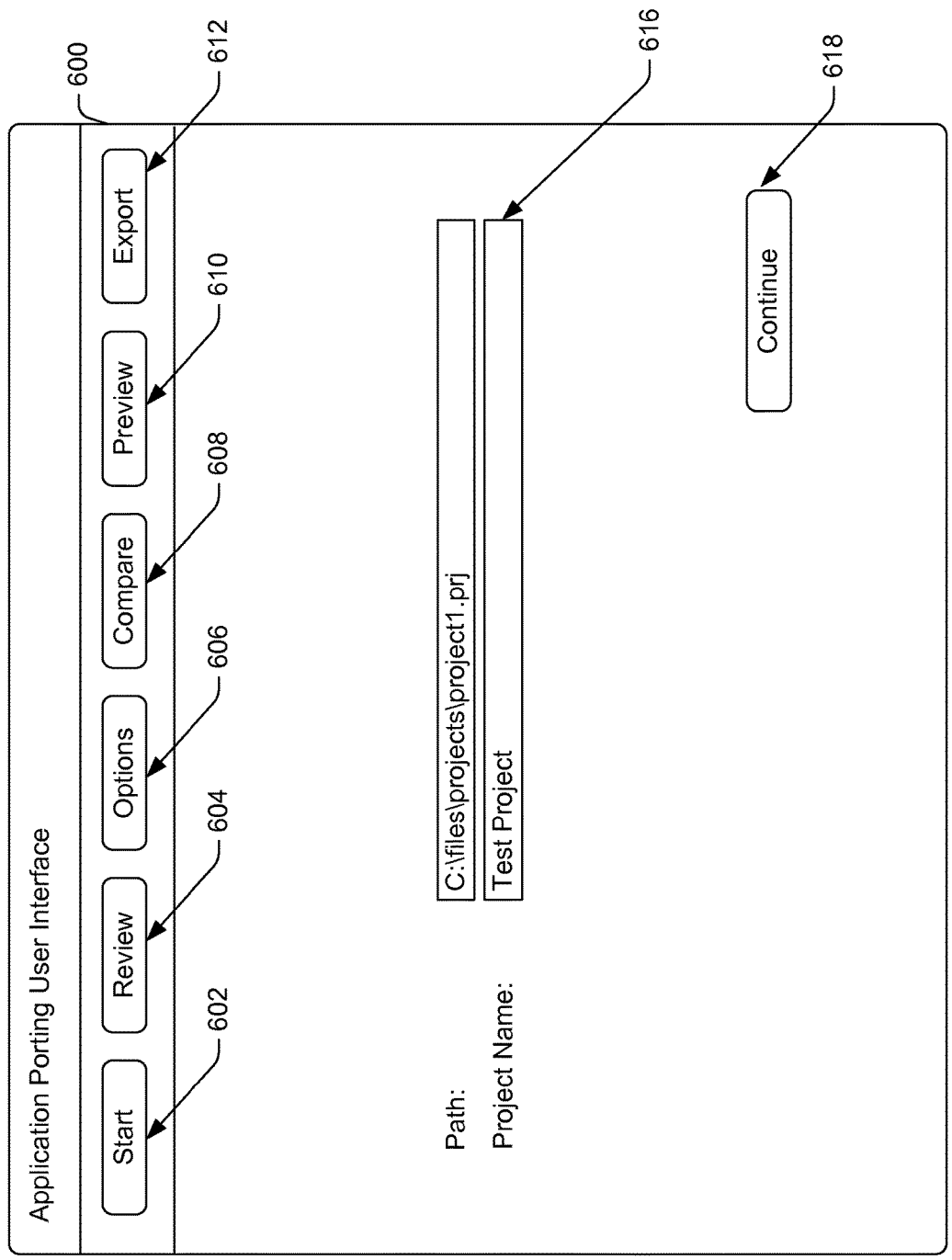
FIG. 6 is an illustrative initial user interface of a software platform that performs automated porting of applications.

FIG. 6 is an illustrative initial user interface 600 of a software platform that performs automated porting of applications. In various embodiments, the software platform may be the application 224. The user interface 600 may include a start button 602, a review button 604, an options button 606, a compare button 608, a preview button 610, and an export button 612. The start button 602 may be used to start a transformation project. The transformation project may be a project that converts the source code 102 into the transformed code 116. The activation of the start button 602 may cause the user interface to provide a directory path field 614 and a project name field 616. The directory path field 614 may enable a user to enter a directory location at which the project is located. The project name field 616 may display the name of the project that resides at the directory location. The activation of the okay button 618 may cause the application 224 to load the project at the directory location for transformation or analysis.

The activation of the review button 604 may cause the application 224 to display the source code 102 or the transformed code 116 that is generated from the source code 102 via a review user interface. The review user interface may include a code section display section and a source code section. The component display section may displays one or more code sections, e.g., files, of the source code 102 or the transformed code 116. Accordingly, the selection of a code section that is displayed in the code section display portion may cause the source code portion to display the code in the code section. In various embodiments, the code section display portion may enable the user to add additional code to the code section, modify code in the code section, or deleted portions of the code section.

The activation of the options button 606 may provide an option user interface that enables the user to select the optimization of the transformation of the source code 102 into the transformed code 116. In various embodiments, the transformation of the source code 102 may be optimized for either size or speed. The optimization of the transformation for size minimizes the file size of the transformed code 116 that is generated from the source code 102, without any regard to an execution speed of the transformed code 116. In contrast, the optimization of the transformation for speed results in the transformed code 116 that executes with minimal execution speed, but which is transformed without any regard as to the file size of the transformed code 116.

The activation of the compare button 608 may cause the application 224 to provide a compare user interface. The compare user interface may enable the user to compare a code section in the source code 102 to one or more corresponding code sections in the transformed code 116. Such comparisons may provide information that include an amount of the transformation that occurred for code sections in the source code 102, an amount of confidence in the transformation, the location and placement of additional codes to implement the transformation, and/or so forth. Additional details regarding the operation of the compare button 608 is further described in FIG. 7.

The activation of the preview button 610 may cause the application 224 to provide a preview user interface. The preview user interface may enable the user to execute one or more code sections of the transformed code 116 without using a separate IDE. In addition to the execution of the code sections, the preview user interface may provide event handlers, source code sections, as well as stack traces that are associated with the code sections. Additional details regarding the operation of the preview button 610 is further described in FIG. 8. The activation of the export button 612 may cause the application 224 to provide an export interface. The export interface may enable the user to distribute the transformed code 116 into a new application or an original application that includes the source code 102. Additional details regarding the operation of the export button is further described in FIG. 9.

Figure 7:
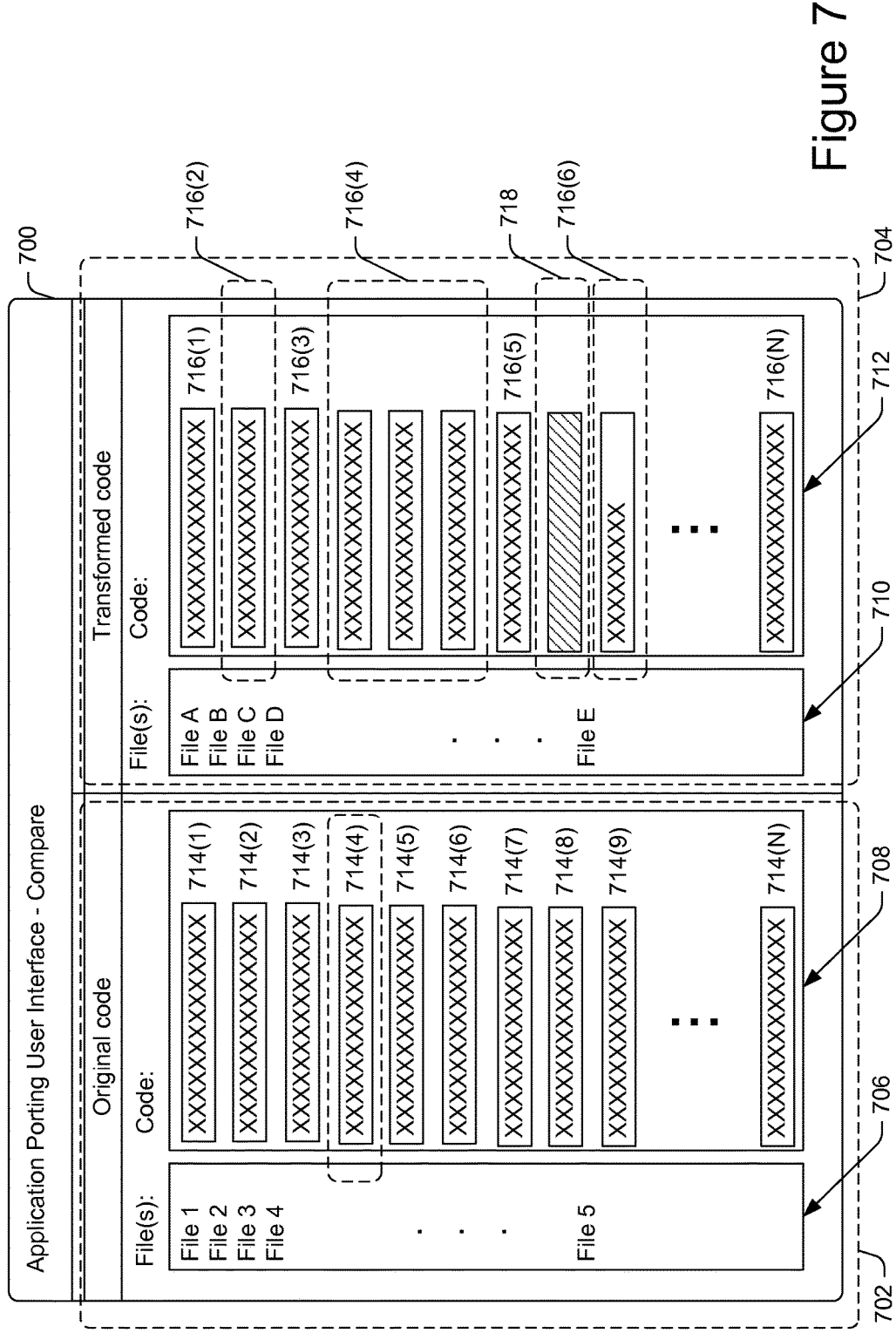
FIG. 7 is an illustrative comparison user interface of a software platform that performs automated porting of applications.

FIG. 7 is an illustrative comparison user interface 700 of a software platform that performs automated porting of applications. The comparison user interface 700 may be generated by the comparison module 242. The illustrative comparison user interface 700 may include an original code display section 702 and a transformed code display section 704. The original code display section 702 may include a component display section 706 that display the one or more files that contain the original code (e.g., the source code 102) and a code display section 708. Similarly, the transformed code display section 704 may include a component display section 710 and a code display section 712. The component display section 706 may display files of the transformed code, such as the transformed code 116 that corresponds to the original code. The code display section 712 may display the code sections that are in a file of the transformed code.

Accordingly, the selection of a file, such as "file 1," from the component display section 706 may cause the code display section 708 to display the original code portions include in the selected file. For example, the original code portions may be the original code portions 714(1)-714(N). Upon the selection of on an original code portion in the code display section 708, the code display section 712 of the transformed code display section 704 may display one or more transformed code portions that correspond to the selected original code portion. For example, when the original code portion 714(4) is selected in the code display section 708, the one or more corresponding transformed code portions, such as the transformed code portions 716(1)-716(N), may be displayed in the code display section 712. In one instance, the transformation of the source code 102 to the transformed code 116 may not have resulted in a change to the original code portion 714(4). In such an instance, the code portion 716(2) that corresponds to the original code portion 714(4) may have the same content as the original code portion 714(4).

However, in another instance, the transformation of the source code 102 may result in a substantial transformation of the original code portion 714(4). In such an instance, the corresponding transformed code portion may be the code portion 716(4). The transformed code portion 716(4) may include more coding than the original code portion 714(4), as additional coding (e.g., wrapper code) is added as a part of the transformation. In an additional instance, the transformation of the source code 102 may result in an absence of any code portion that corresponds to the original code portion 714(4) in the transformed code 116. In such an instance, the lack of a corresponding code portion in the transformed code 116 may be denoted by a blank space 718. In a further instance, the transformation of the source code 102 may result in a corresponding transformed code portion 714(N) that is smaller in size than the original code portion 714(4). For example, such reduction in size may be due to the elimination or simplification of one or more functions.

In some embodiments, the code display section 712 of the transformed code display section 704 may use indicators to show the different types of changes between an original code portion in the source code 102 and its corresponding code portion in the transformed code 116. The indicators may be different text colors, different text color highlighting, different text font or size, and/or other different forms of text emphasis. In an example with respect to the original code section 714(4), the code display section 712 may use a first color to show new coding that is added to the transformed code 116. For instance, at least a part of the code portion 716 may be shown in blue. A second color may be used to designate that a code portion is identical in both the source code 102 and the transformed code 116. For instance, the code portion 716(2) may be shown in pink. Further, a transformed code portion that differs from its corresponding original portion, such as the transformed code portion 716(6), may be shown in red. In some embodiments, the indicators may show the amount of differences between the original code portions and its corresponding transformed code portions. For example, the application 224 may compare the text in the code portions to calculate a degree of similarity between the code portions. A determination of the amount of differences may be based on calculating a similarity score.

The similarity score may be determined dynamically by comparing the source code against the transformed code. For example, a parser may analyze both the source code and the corresponding transformed code, and generate a value corresponding to the amount of changes made or other lexicographical analysis. Alternatively, the similarity score may be statically determined. For example, for each source code and transformed code correspondence, the application is aware of which transformation rules were applied, the complexity of the transformation rules, and the number of transformation rules. From this information, a similarity score may be determined. Accordingly, the code display section 712 may use different indicators to differentiate between different degrees of similarities. For example, the code display section 712 may show different colors for different values of similarity from a similarity score, display a percentage similarity value calculated from a similarity score, etc.

In other embodiments, the code display section 712 may use indicators to show an amount of confidence that the application 224 properly transformed an original code portion to a transformed code portion. The measure of confidence may be based on an evaluation of how well the application 224 performed code separation. During code separation, the code separation algorithm of transformation module 238 may generate a measure that estimates whether an original code portion of a source code 102 maps to a user interface portion of the target architecture or a business logic portion of the target architecture. As such mapping is influential in whether the original code portion is properly transformed. In one instance, the measure may be a confidence value on a numerical scale, e.g., a numerical value in a numerical range that varies from 1 to 10. Accordingly, the code display section 712 may show different indicators that correlate with different confidence values. For example, a transformed code portion may be highlighted with a specific shade of a particular color or a particular color of different colors to show a confidence value for the transformed code portion. In another example, the code display section 712 may display a confidence value associated with the transformed code portion.

The transformed code display section 704 may also provide additional user interface functionalities to the user. For instance, the component display section 710 may enable the user to navigate to different files of the transformed code 116. Further, the code display section 712 may include an editor function that enables a user to directly edit the text of the displayed transformed code portions. Additionally, the selection of a transformed code portion displayed in the code display section 712 may cause the code display section 708 to show a corresponding original code portion.

In other embodiments, the code display section 708 and the code display section 712 may provide other indicators to illustrate the relationships between a source code portion and a transformed code portion. These indicators may include vertical and/or horizontal indentations to indicate levels and alignments of transformations. Additional indicators may show one-to-many correspondences between a source code portion (e.g., file) and multiple transformed code portions (e.g., files), and vice versa. These one-to-many correspondences may be influenced by loss coupling or strong coupling between the source code 102 and the transformed code 116 as configured during transformation. For example, code portions shown in the code display section 708 and the code display section 712 may be linked with trace indicators (e.g., lines) that map these one-to-many relationships. Such trace indicators may be turned on and off based on inputs of the user to the comparison user interface 700.

Figure 8:
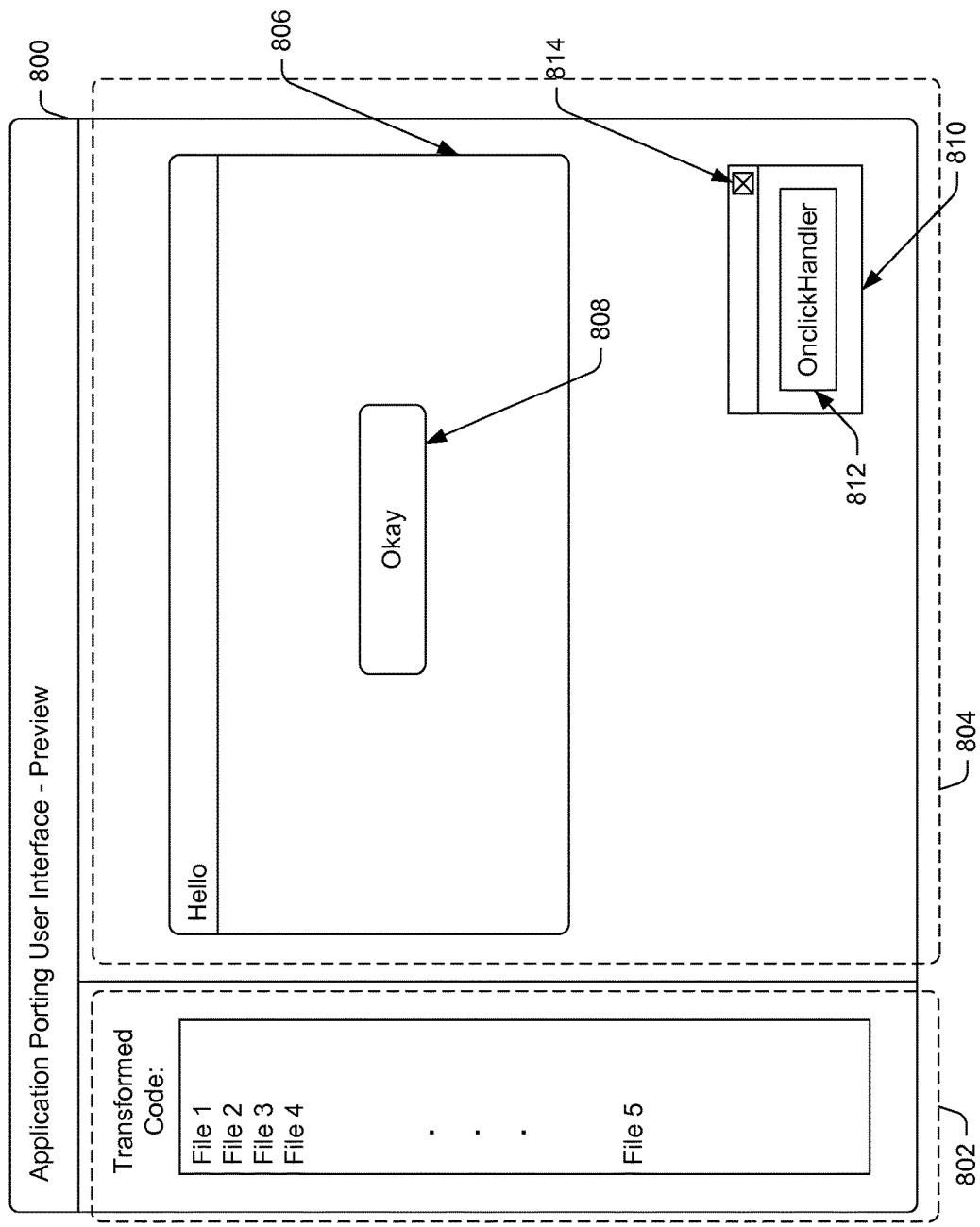
FIG. 8 is an illustrative preview user interface of a software platform that performs automated porting of applications.

FIG. 8 is an illustrative preview user interface 800 of a software platform that performs automated porting of applications. The preview user interface 800 may be generated by the preview module 244. The preview user interface 800 may include a component display portion 802 and an execution preview portion 804. The component display portion 802 may display various files that include transformed code, such as the transformed code 116. The files may provide application components that are executable in the execution preview portion 804. Accordingly, the user may select one of the files displayed in the component display portion 802 for execution. For example, the execution of a file selected from the component display portion 802 may result in the display of component graphics 806 in the execution preview portion 804.

For example, the component graphics 806 may be a dialogue box that include a button 808. Additionally, the execution preview portion 804 may also display one or more event handlers of the component in an event handler display area 810. For example, the event handler display area 810 may display an event handler identifier 812. The event handler identifier 812 may be the identifier of an event handler for the button 808. In some embodiments, the event handler identifier 812 may be selected to display a corresponding transformed code portion in the file selected via the component display portion 802. In other embodiments, the event handler identifier 812 may be selected to identify the functions and/or methods constituting a stack trace. The stack trace may be a trace of the one or more calling function in the order of an execution stack starting with the event handler. In some instances, a selection of a calling function as displayed may generate a display of the related transformed code portion and/or the corresponding source code portion. The event handler display area 810 may also include a control button 814 that enables the user to terminate the display of the event handler display area 810. In other embodiments, the component display portion 802 and the execution preview portion 804 may display components and event handlers for the source code 102 in a similar manner, such that corresponding source code portion of a source code file may be viewed and a stack trace for the corresponding component may be identified.

The execution preview portion 804 may also display an interface with return values during the execution of an application component. For example, the execution of a function triggered by an event handler may generate a particular exception value. These return values may be useful for debugging or determining semantic equivalence between code portions. In some embodiments, the application 224 may automatically correlate certain return values with explanation messages from a message database to assist the user in understanding the meanings of the return values.

Figure 9:
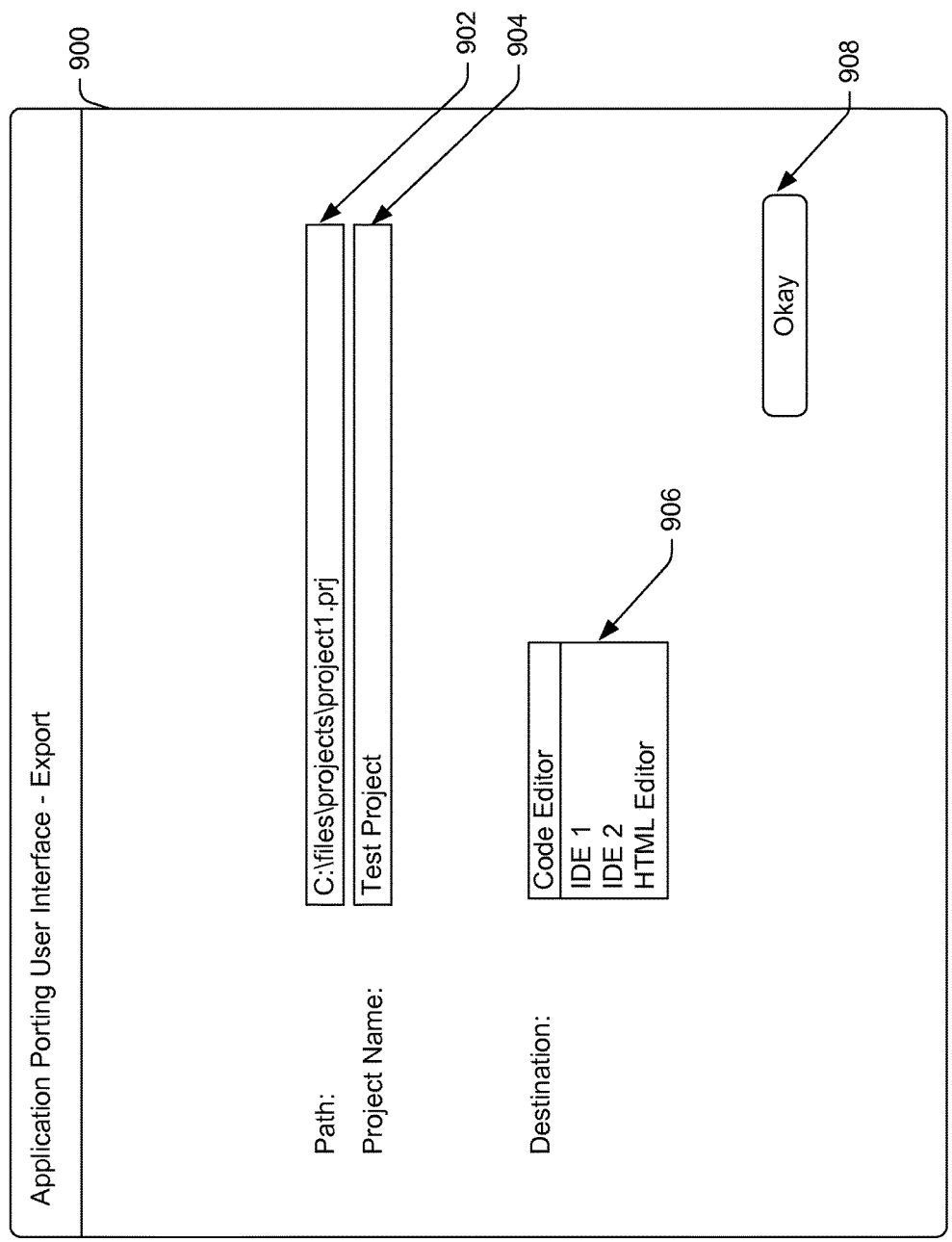
FIG. 9 is an illustrative export user interface of a software platform that performs automated porting of applications.

FIG. 9 is an illustrative export user interface 900 of a software platform that performs automated porting of applications. The export user interface 900 may be generated by the export module 246. The export user interface 900 may be used to export transformed code (e.g., transformed code 116) in the form of a project from a location on the server 216 to another destination. The export user interface 900 may include a path field 902, a project name field 904, and a destination field 906. The path field 902 may be used to navigate to a desired file directory location where a project resides. In various embodiments, the project may include a plurality of components, e.g., files. The project name field 904 may display the name of the project at the desired file directory location.

The destination field 906 may enable a user to select a destination that is to receive the selected project. In some embodiments, the destination may be a standalone code editor, an IDE, a HTML editor, or some other destination. In other embodiments, the destination may be an application, such as a third-party application or an application that provided the corresponding source code 102. Once the appropriate project and destination has been selected, the user may activate the okay button 908 to cause the application 224 to implement the export.

Figure 10:
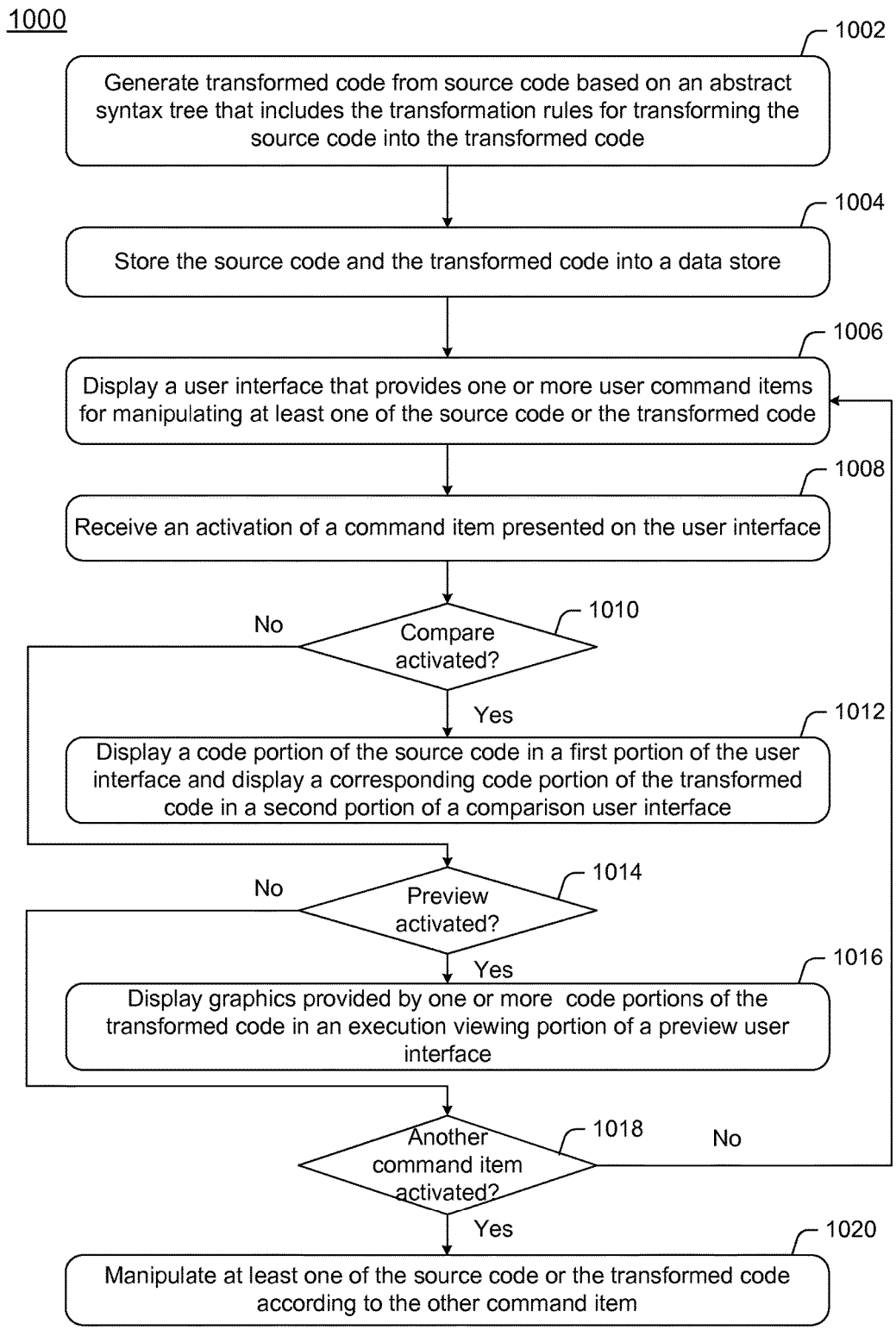
FIG. 10 is a flowchart of exemplary operations performed on the source code or the transformed code generated from the source code.

FIG. 10 is a flowchart of exemplary operations performed on the original code or the transformed code generated from the original code. In block 1002 of the embodiment 1000, the application 224 may generate transformed code 116 from the source code 102 based on an abstract syntax tree. The abstract syntax tree may include transformation rules for transforming the source code 102 into the transformed code 116. The generation of the transformed code 116 from the source code 102 may be performed using code separation with semantic guarantees.

In block 1004, the application 224 may store the source code 102 and the transformed code 116 into a data store, such as the data store 228. In block 1006, the application 224 may display a user interface that provides one or more user command items for manipulating at least one of the source code 102 or the transformed code 116. In various embodiments, the application 224 may display the user interface 600. The user interface 600 may enable a user to select a project that includes the source code 102 or the transformed code 116.

In decision block 1010, the application 224 may determinate whether a compare command item is activated. If the compare command item is activated, the application 224 may perform block 1012. In block 1012, the application 224 may display a comparison user interface that enables the user to compare a code portions of the source code 102 and the transformed code 116. For example, the comparison use interface may be the comparison user interface 700. The comparison user interface 700 may display a code portion of the source code 102 in a first portion of the interface. The comparison user interface 700 may display a corresponding code section of the transformed code 116 in a second portion of the user interface.

However, if the compare command item is not activated, the application 224 may perform decision block 1014. At decision block 1014, the application 224 may determine whether a preview command is activated. If the preview command item is activated, the application 224 may perform block 1016. In block 1016, the application 224 may display a preview user interface that enables the use to view the execution of one or more code portions of the transformed code. For example, the preview user interface may be the preview user interface 800. Accordingly, a user may select a particular code portion from a component display portion of the preview user interface. The execution of the particular code portion is displayed in an execution preview portion of the user interface. The execution preview portion may enable the user to interact with event handlers called in the particular code portion or perform a stack trace with respect to the particular code portion.

However, if the preview command item is not activated, the application 224 may perform decision block 1018. In decision block 1018, the application 224 may determine whether another command item is activated. In various embodiments, the other command item may be a transformation command item, an export command item, a review command item, or some other command item. Accordingly, the application 224 may manipulate at least one of the source code or the transformed code according to the other command item. Otherwise, the application may loop back to block 1006, so that the application 224 may continue to display the user interface that provides one or more user command items for manipulating at least one of the source code 102 or the transformed code 116.

Figure 11:
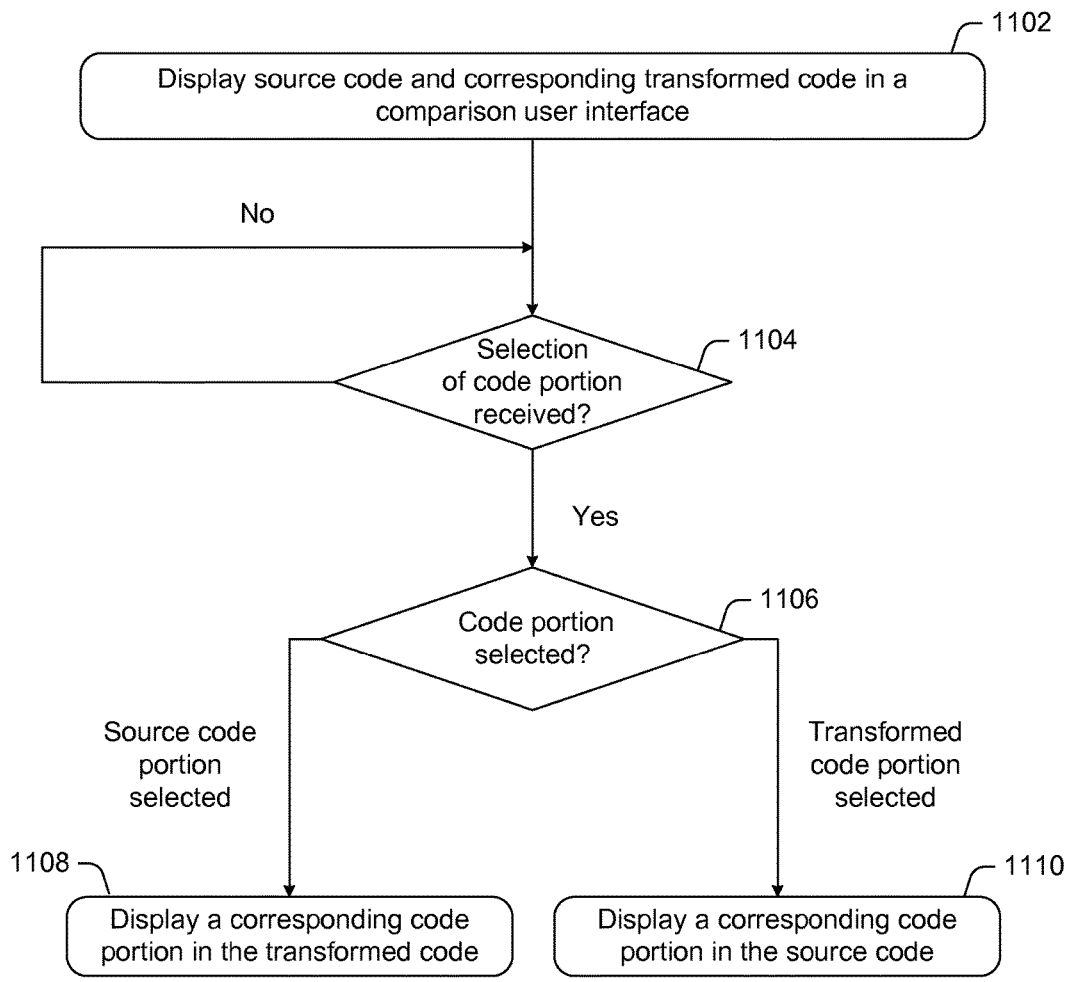
FIG. 11 is a flowchart of an exemplary display operation performed on source code or the transformed code generated from the source code.

FIG. 11 is a flowchart of an exemplary display operation performed on original code or the transformed code generated from the original code. FIG. 11 further illustrates block 1012 of the embodiment 1000. In block 1102, the application 224 may display the source code 102 or the transformed code 116 in a comparison user interface. The display of the source code 102 or the transformed code 116 may include displaying any portion of respective code that is able to fit in the comparison user interface. In various embodiments, the comparison user interface may be the comparison user interface 700. The source code 102 may be displayed in a first pane of the comparison user interface, and the transformed code 116 may be displayed in a second pane of the comparison user interface. In decision block 1104, the application 224 may determine whether a selection of a code portion of the source code or the transformed code 116 is received. If a code portion is not selected, the application 224 may loop back to await the selection of a code portion. However, if a code portion is selected, the application 224 may continue to decision block 1106. In decision block 1106, the application 224 may determine whether the selection code portion is from the source code 102 or the transformed code 116. If the application 224 determines that the code portion of the source code 102 is selected, the application 224 may perform block 118. In block 1108, the application may display a corresponding code portion in the transformed code 116.

However, if the code portion of the transformed code 116 is determined to be selected at decision block 1106, the application 224 may perform block 1110. In block 1110, the application 224 may display a corresponding code portion of the source code 102. In at least one embodiment, the comparison user interface 700 may provide various indicators that show the relationships between the code sections of the source code 102 and the transformed code 116 as displayed in the interface. The relationships may include an amount of difference between the code portions, an estimate of the confidence that a code portion of the source code 102 is properly transformed into a transformed code portion, and/or so forth.

Figure 12:
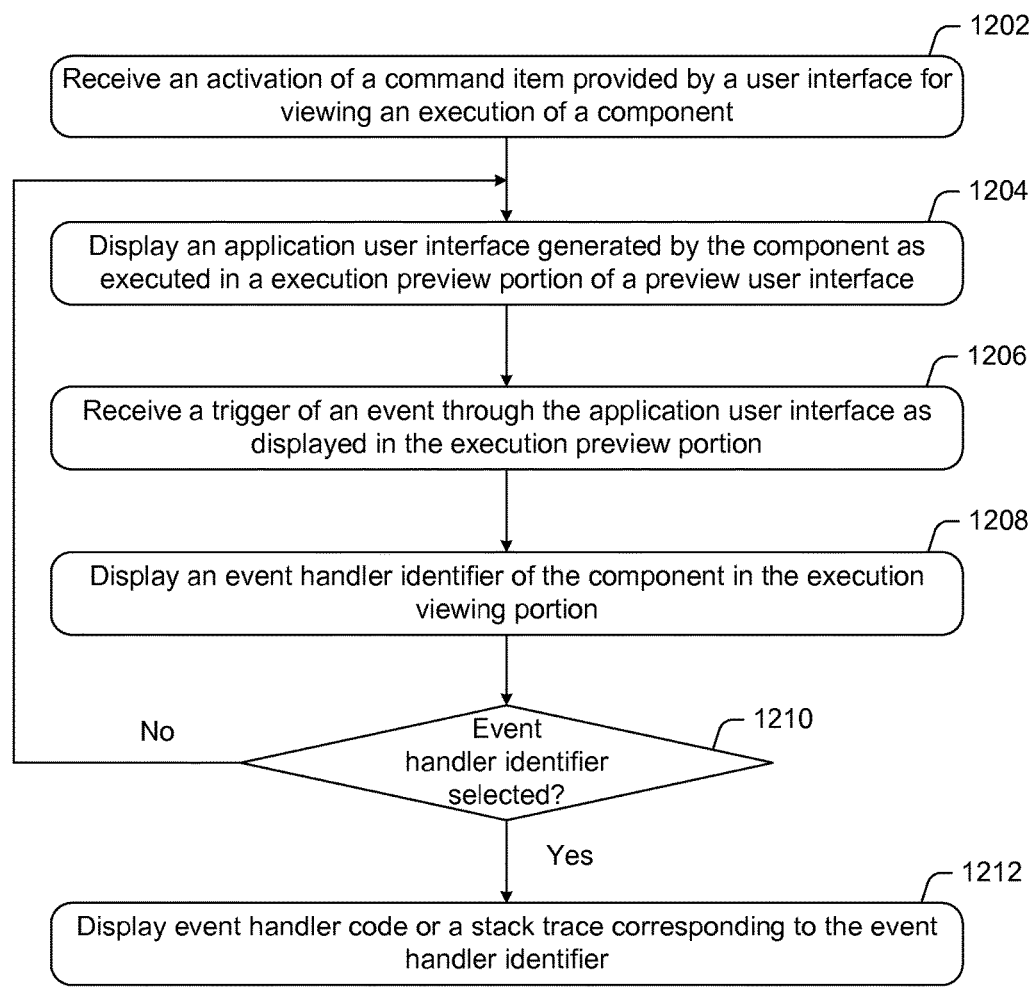
FIG. 12 is a flowchart of an exemplary display operation initiated by an even trigger that is performed on the transformed code generated from the source code.

FIG. 12 is a flowchart of an exemplary display operation initiated by an even trigger that is performed on the transformed code generated from the original code. In block 1202 of the embodiment 1200, the application 224 may receive an activation of a command item provide by a user interface for viewing an execution of a component. For example, the user interface may be the user interface 600. The component may be a component of the transformed code 116. In various embodiments, the execution of the component may be viewed in the execution preview portion 804 of the preview user interface 800.

In block 1204, the execution preview portion 804 may display an application user interface of the component as executed in the execution preview portion 804 of the preview user interface 800. In block 1206, the execution preview portion 804 may receive a trigger of an event through the application user interface as displayed in the execution preview portion 804. For example, the event may be the click of a button that is presented by the application user interface.

In block 1208, the execution preview portion 804 may display an event handler identifier of the component in the execution viewing portion. In various embodiments, the event handler identifier may be display by the event handler display area 810 that is instantiated in the execution preview portion 804. In decision block 1210, the application 224 may determine whether the event handler identifier is selected via the execution preview portion 804. If the event handler identifier is selected, the application 224 may proceed to block 1212. In block 1212, the execution preview portion 804 may display event handler code or a stack trace corresponding to the event handler identifier. In various embodiments, the application 224 may instantiate a new display area within the execution preview portion 804 to display the event handler code or the stack trace. However, if the event handler identifier is not selected, the application 224 may loop back to block 1204 to maintain the display of the application user interface generated by the component.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more non-transitory computer-readable media storing computer-executable instructions that are executable to cause one or more processors to perform acts comprising:
generating transformed code from source code based on an architecture template that describes a target architecture and an abstract syntax tree, the architectural template describing at least one of an advantage or a disadvantage of a target architecture, the abstract syntax tree including transformation rules that are generated according to the architectural template for transforming the source code into the transformed code for execution on the target architecture, the advantage or disadvantage specified in the architectural template causing reposition of at least one candidate component in the abstract syntax tree as being associated with a first component type rather than a second component type specified in the architectural template;
storing the source code and the transformed code in a data store used by an application, the transformed code is a transformation of the source code by at least one business semantic preserving code transform, the at least one business semantic preserving transform causes an execution of the transformed code in a new execution scenario to produce an identical semantic effect as an execution of the source code in an old execution scenario, wherein the identical semantic effect is guaranteed by annotations in the abstract syntax tree; and
causing a display of a user interface of the application on a display device, the user interface providing one or more user command items for manipulating at least one of the source code or the transformed code stored in the data store.

2. The one or more non-transitory computer-readable media of claim 1, further comprising:
receiving an activation of a command item for displaying content of the source code and content of the transformed code on the user interface; and
causing a display of a content section of the source code in a first portion of the user interface and a content section of the transformed code in a second portion of the user interface.

3. The one or more non-transitory computer-readable media of claim 2, further comprising:
receiving a selection of a code portion in the source code or a code portion in the transformed code displayed in the user interface;
causing a display of a corresponding code portion in the transformed code when the selection is of the code portion in the source code; and
causing a display of a corresponding code portion in the source code when the selection is of the code portion in the transformed code.

4. The one or more non-transitory computer-readable media of claim 2, further comprising causing a display of one or more indicators in at least one of the first portion or the second portion of the user interface that indicate relationships between the source code and the transformed code, the relationship including one or more of whether a correspondence code portion exists for a code portion of the source code or the transformed code, an amount of difference between corresponding code portions in the source code and the transformed code, or an addition of a new code portion that is absent from the source code to the transformed code.

5. The one or more non-transitory computer-readable media of claim 1, further comprising:
receiving an activation of a command item for viewing an application user interface provided by the source code or the transformed code; and
causing a display of the application user interface provided by the transformed code or the source code in a viewing portion of the user interface.

6. The one or more non-transitory computer-readable media of claim 5, further comprising causing a display of an event handler identifier in the source code or the transformed code in response to a triggering of an associated event through the application user interface provided by the source code or the transformed code, the event handler identifier being selectable to provide access to a corresponding stack trace of one or more functions in the source code or the transformed code, or to provide access to a corresponding event handling code in the source code or the transformed code.

7. The one or more non-transitory computer-readable media of claim 5, wherein the user interface provides access to a code editor in response to an editing request, further comprising receiving a modification to the transformed code via the code editor.

8. The one or more non-transitory computer-readable media of claim 1, further comprising:
receiving an activation of a command item for transferring the transformed code to an additional application or the application; and
transferring the transformed code to the additional application or the application.

9. The one or more non-transitory computer-readable media of claim 1, wherein the abstract syntax tree supports a composite grammar that includes (1) input grammars of the input programming language of the source code and (2) output grammars of the multiple output programming languages of the transformed code.

10. The one or more non-transitory computer-readable media of claim 1, wherein the at least one business semantic preserving code transform includes one or more of a code separation of code portions in the source code, a language transformation of a code portion in the source code from a first programming language to a second language, a modification of the code portion in the source code to execute on a different form factor, an addition of a wrapper code portion to the source code to provide a network connection functionality, or an optimization of the code portion in the source code for execution in the new execution scenario.

11. The one or more non-transitory computer-readable media of claim 1, wherein the new execution scenario differs from the old execution scenario in at least one of execution performance requirement, execution form factor requirement, architectural requirement, user cardinality requirement, or optimization requirement.

12. A computer-implemented method, comprising:
generating, at one or more computing devices, transformed code from source code based on an architecture template that describes a target architecture and an abstract syntax tree, the architectural template describing at least one of an advantage or a disadvantage of a target architecture, the abstract syntax tree including transformation rules that are generated according to the architectural template for transforming the source code into the transformed code for execution on the target architecture, the advantage or disadvantage specified in the architectural template causing reposition of at least one candidate component in the abstract syntax tree as being associated with a first component type rather than a second component type specified in the architectural template;
displaying a user interface on a display device that provides access to an integrated development environment (IDE), the IDE providing an option for overriding an inference that a candidate component in the abstract syntax tree is associated with the first component type;
storing the source code and the transformed code into a data store of the one or more computing devices, the transformed code is a transformation of the source code by at least one business semantic preserving code transform, the at least one business semantic preserving transform causes an execution of the transformed code in a new execution scenario to produce an identical semantic effect as an execution of the source code in an old execution scenario; and
displaying an additional user interface on a display device, the additional user interface providing one or more user command items for manipulating at least one of the source code or the transformed code stored in the data store.

13. The computer-implemented method of claim 12, further comprising:
receiving an activation of a command item for displaying content of the source code and the content of the transformed code on the user interface; and
displaying a content section of the source code in a first portion of the user interface and a content section of the transformed code in a second portion of the user interface.

14. The computer-implemented method of claim 13, further comprising:
presenting one or more indicators in at least one of the first portion or the second portion of the user interface that indicate relationships between the source code and the transformed code, the relationship including one or more of whether a correspondence code portion exists for a code portion of the source code or the transformed code, an amount of difference between corresponding code portions in the source code and the transformed code, or an addition of a new code portion that is absent from the source code to the transformed code.

15. The computer-implemented method of claim 12, further comprising:
receiving an activation of a command item for viewing an application user interface provided by the source code or the transformed code; and
displaying the application user interface provided by the source code or the transformed code in a viewing portion of the user interface.

16. The computer-implemented method of claim 15, further comprising causing a display of an event handler identifier in the source code or the transformed code in response to a triggering of an associated event through the application user interface provided by the source code or the transformed code, the event handler identifier being selectable to provide access to a corresponding stack trace of one or more functions in the source code or the transformed code, or to provide access to a corresponding event handling code in the source code or the transformed code.

17. The computer-implemented method of claim 12, wherein the at least one business semantic preserving code transform includes one or more of a code separation of code portions in the source code, a language transformation of a code portion in the source code from a first programming language to a second language, a modification of the code portion in the source code to execute on a different form factor, an addition of a wrapper code portion to the source code to provide a network connection functionality, or an optimization of the code portion in the source code for execution in the new execution scenario.

18. The computer-implemented method of claim 12, wherein the new execution scenario differs from the old execution scenario in at least one of execution performance requirement, execution form factor requirement, architectural requirement, user cardinality requirement, or optimization requirement.

19. A system, comprising:
a display device;
one or more processors;
memory storing components of a software tool, the components executable by the one or more processors, the components comprising:
a data storage component to store source code and transformed code into a data store, the transformed code is a transformation of the source code by at least one business semantic preserving code transform, the at least one business semantic preserving transform causes an execution of the transformed code in a new execution scenario to produce an identical semantic effect as an execution of the source code in an old execution scenario;
a code porting component that generates the transformed code from the source code based on an architectural template that describes a target architecture and an abstract syntax tree that includes transformation rules, the architectural template describing at least one of an advantage or a disadvantage of a target architecture, the abstract syntax tree guaranteeing the identical semantic effect, the abstract syntax tree supporting a composite grammar that includes input grammars of at least one input programming language of the source code and output grammars of at least one programming language of a target architecture for the transformed code, the advantage or the disadvantage specified in the architectural template causing reposition of at least one candidate component in the abstract syntax tree as being associated with a first component type rather than a second component type specified in the architectural template;
an estimation component that generates a similarity score that indicates an amount of difference between a code portion in the source code and a corresponding code portion the transformed code; and a user interface component that provides a color indication that is selected from a plurality of color indications to indicate a value of the similarity score.

20. The system of claim 19, wherein the abstract syntax tree includes transformation rules for transforming the source code into the transformed code such that the identical semantic effect of the execution of the source code and the execution of the transformed code that results from the at least one business semantic transform is guaranteed by annotations in the abstract syntax tree.

21. The system of claim 19, wherein the user interface component further presents a content section of the source code in a first portion of the user interface and a content section of the transformed code in a second portion of the user interface in response to an activation of a command item.

22. The system of claim 21, wherein the user interface component further presents one or more indicators in at least one of the first portion or the second portion of the user interface that indicate relationships between the source code and the transformed code, the relationship including one or more of whether a correspondence code portion exists for a code portion of the source code or the transformed code, an amount of difference between corresponding code portions in the source code and the transformed code, or an addition of a new code portion that is absent from the source code to the transformed code.

23. The system of claim 19, wherein the user interface component further provides one or more user command items for presentation on the display device, the one or more user commands for manipulating at least one of the source code or the transformed code stored in the data store.

24. The system of claim 19, wherein the at least one business semantic preserving code transform includes one or more of a code separation of code portions in the source code, a language transformation of a code portion in the source code from a first programming language to a second language, a modification of the code portion in the source code to execute on a different form factor, an addition of a wrapper code portion to the source code to provide a network connection functionality, or an optimization of the code portion in the source code for execution in the new execution scenario.

* * * * *